Figure 1:
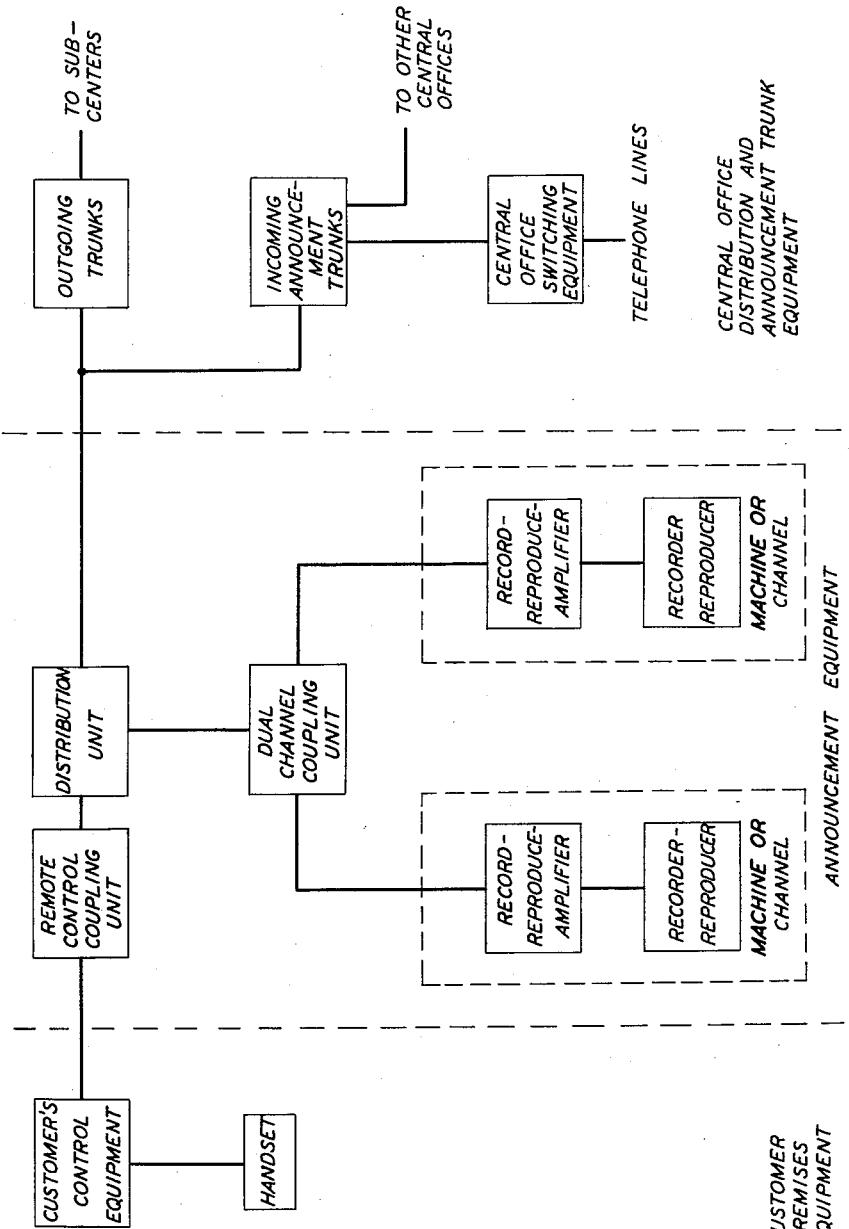

Feb. 20, 1962  R. A. MILLER ETAL  3,022,380
ANNOUNCING SYSTEM
Filed July 29, 1959  11 Sheets-Sheet 4

INVENTORS
R. A. MILLER
V. E. MUNSON
H. M. OWENDOFF
C. M. TARIS

BY

ATTORNEY

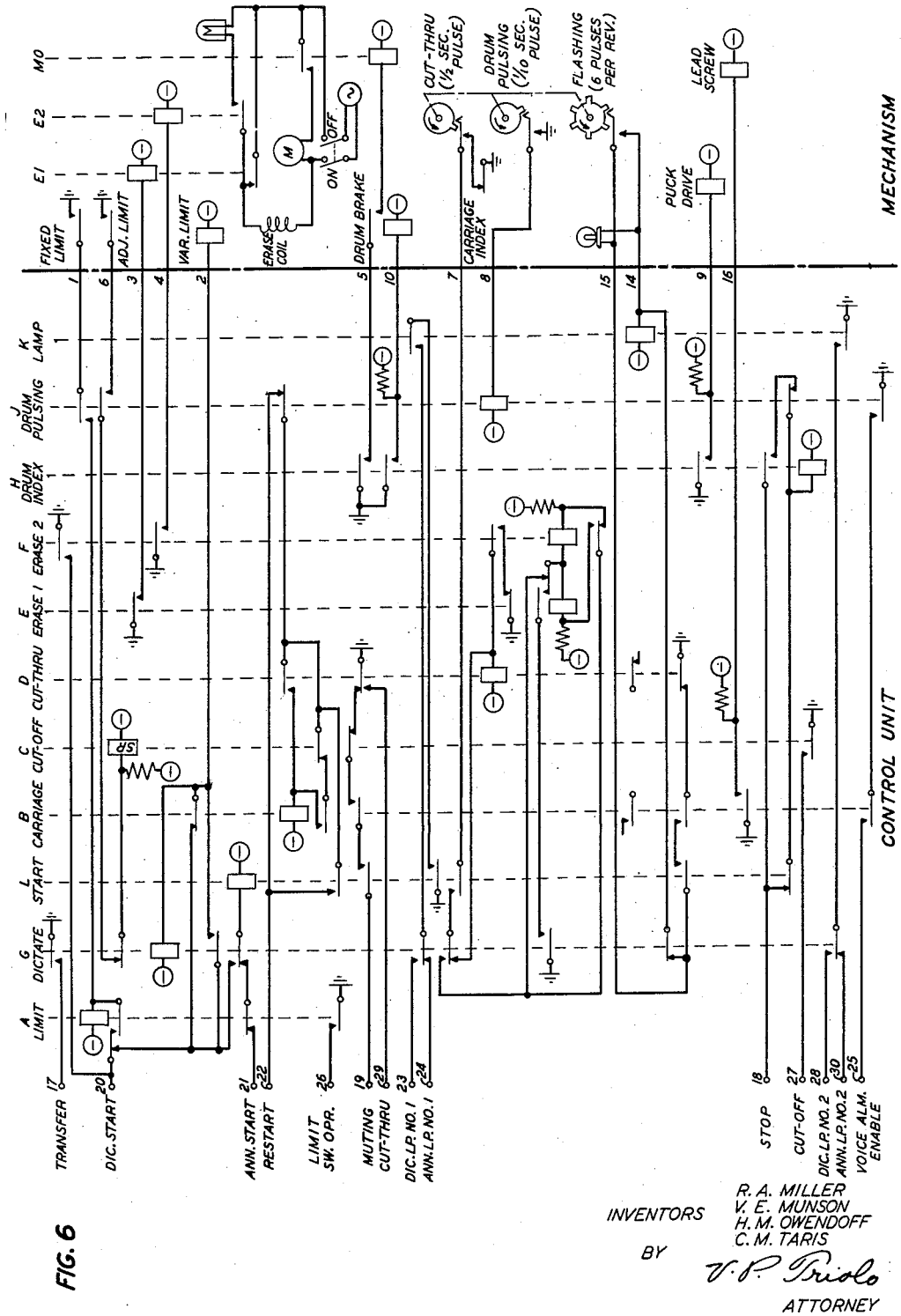

Feb. 20, 1962

R. A. MILLER ETAL
ANNOUNCING SYSTEM 3,022,380

Filed July 29, 1959

11 Sheets-Sheet 6

FIG. 7

INVENTORS
R.A. MILLER
V.E. MUNSON
H.M. OWENDOFF
C.M. TARIS

BY
V. P. Priolo
ATTORNEY

Feb. 20, 1962 R. A. MILLER ETAL 3,022,380
ANNOUNCING SYSTEM
Filed July 29, 1959 11 Sheets-Sheet 7

INVENTORS
R. A. MILLER
V. E. MUNSON
H. M. OWENDOFF
C. M. TARIS
BY
V. P. Priolo
ATTORNEY

CONTROL SIGNAL CIRCUIT

3,022,380
ANNOUNCING SYSTEM

Robert A. Miller, Plainfield, Verne E. Munson, Denville, Harold M. Owendoff, Morris Plains, and Charles M. Taris, Cranford, N.J., assignors to Bell Telephone Laboratories, Incorporated, New York, N.Y., a corporation of New York
Filed July 29, 1959, Ser. No. 830,249
12 Claims. (Cl. 179—6)

This invention relates to announcing systems and more particularly to audio systems for providing transcribed announcements over telephone lines.

Facilities are provided in the telephone plant for furnishing repetitive announcements such as are required for news, and weather announcing services and the interception of telephone calls to vacant and unassigned numbers. In some of these facilities it has been found desirable to employ a dual-channel arrangement to provide a high degree of continuity of service and to allow the user to record and check the announcements before they are transmitted to the callers. At any given instant, during normal dual-channel operation, one of the channels is connected (on-line) to the announcement distribution network. The other channel functions as a standby. Automatic switching facilities are provided for transferring the standby channel to the line in the event of failure of the on-line channel. The customer or sponsor of the announcement service is given the means for recording and checking the announcement, and the control equipment which enables him to do this may be located either in close proximity to the recording equipment or at a remote location. While the equipment for remote control may be located on the customer's premises, the recording and announcement equipment will usually be located at the central office.

In a preferred embodiment of the invention, the control equipment is disposed at a remote location. The recorder-reproducer is designed to operate on a start-stop basis, the machine remaining idle in the absence of a start signal. The on-line channel runs during the time a "call waiting" (CW) signal is received from the central office distribution and announcement trunk equipment or during the time the monitor-on-line (MOL) channel signal is received from the remote control equipment. The standby channel runs only on demand from the remote control equipment for recording a new announcement or for checking the existing announcement.

After a new announcement is recorded on the standby channel the standby channel is transferred to the line. The channel transferred from the line then becomes the standby channel and the newly established on-line announcement is automatically recorded or dubbed on the newly established standby channel.

It is an object of this invention to provide an announcing system which includes facilities for transmitting transcribed announcements over telephone lines with a high degree of accuracy and continuity of service.

In accordance with a feature of the invention this objective is achieved by employing a dual-channel arrangement comprising two separate announcing machines and circuit means normally connected to one of said machines for actuating it in response to a telephone call and for impressing an announcement recorded thereon upon the calling telephone line, wherein said circuit means are shifted or transferred to said other machine when said one machine fails or when a new announcement is to be impressed on the line, and on completion of said shift said new announcement is automatically recorded or dubbed on the machine from which said circuits have been shifted.

In accordance with another feature of the invention this objective is achieved by employing switching arrangements which afford the user complete control of the recording, transfer and dubbing processes under both normal and alarm conditions.

In accordance with still another feature of the invention this objective is achieved by automatic switching means which establish a "live dictate" condition when either the on-line or standby channel fails. The "live dictate" condition permits the operator to transmit the announcement directly to the calling parties while at the same time the announcement is being recorded on the available machine.

Figure 2:
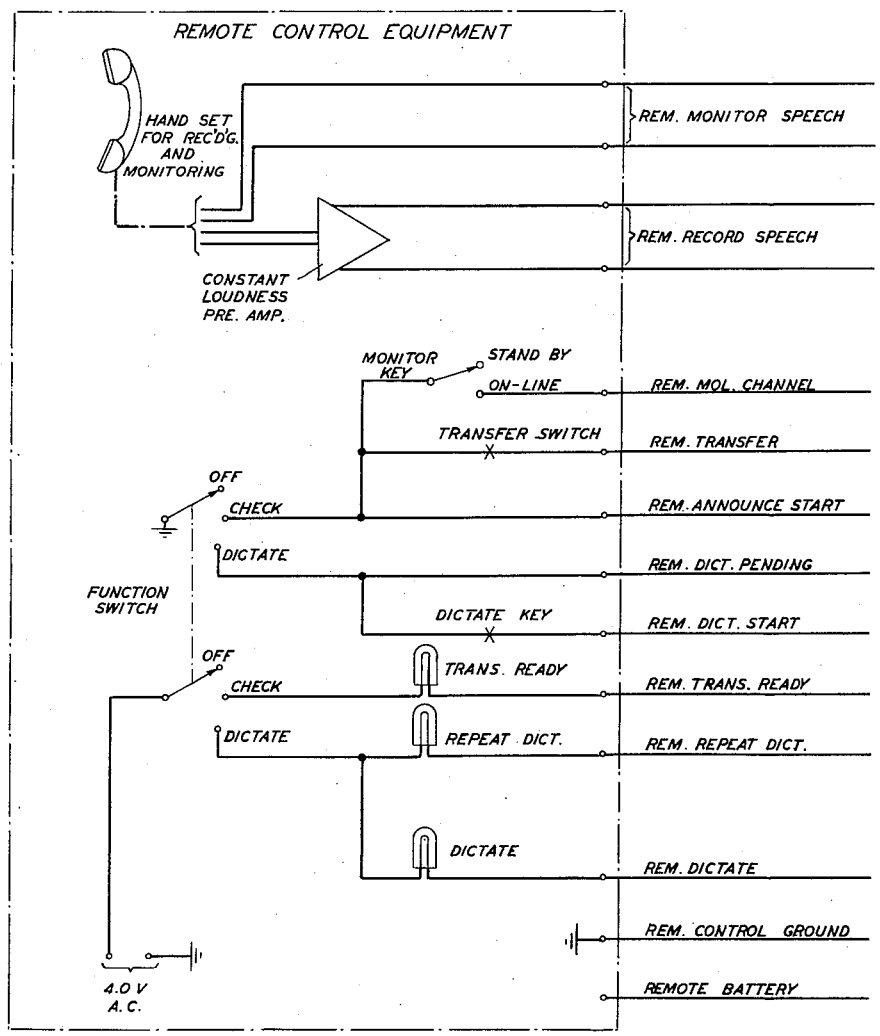
Figure 3:
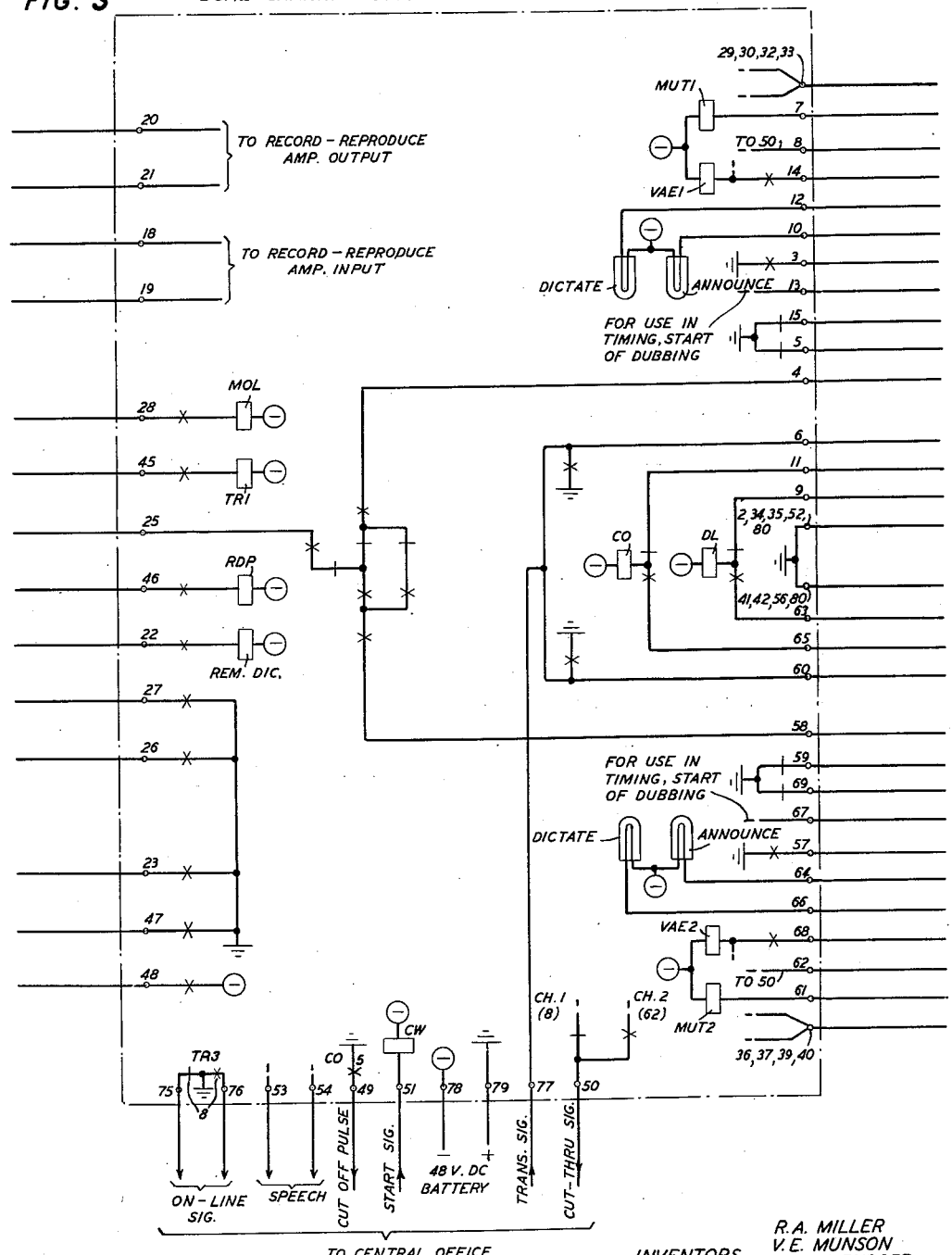
Figure 4:
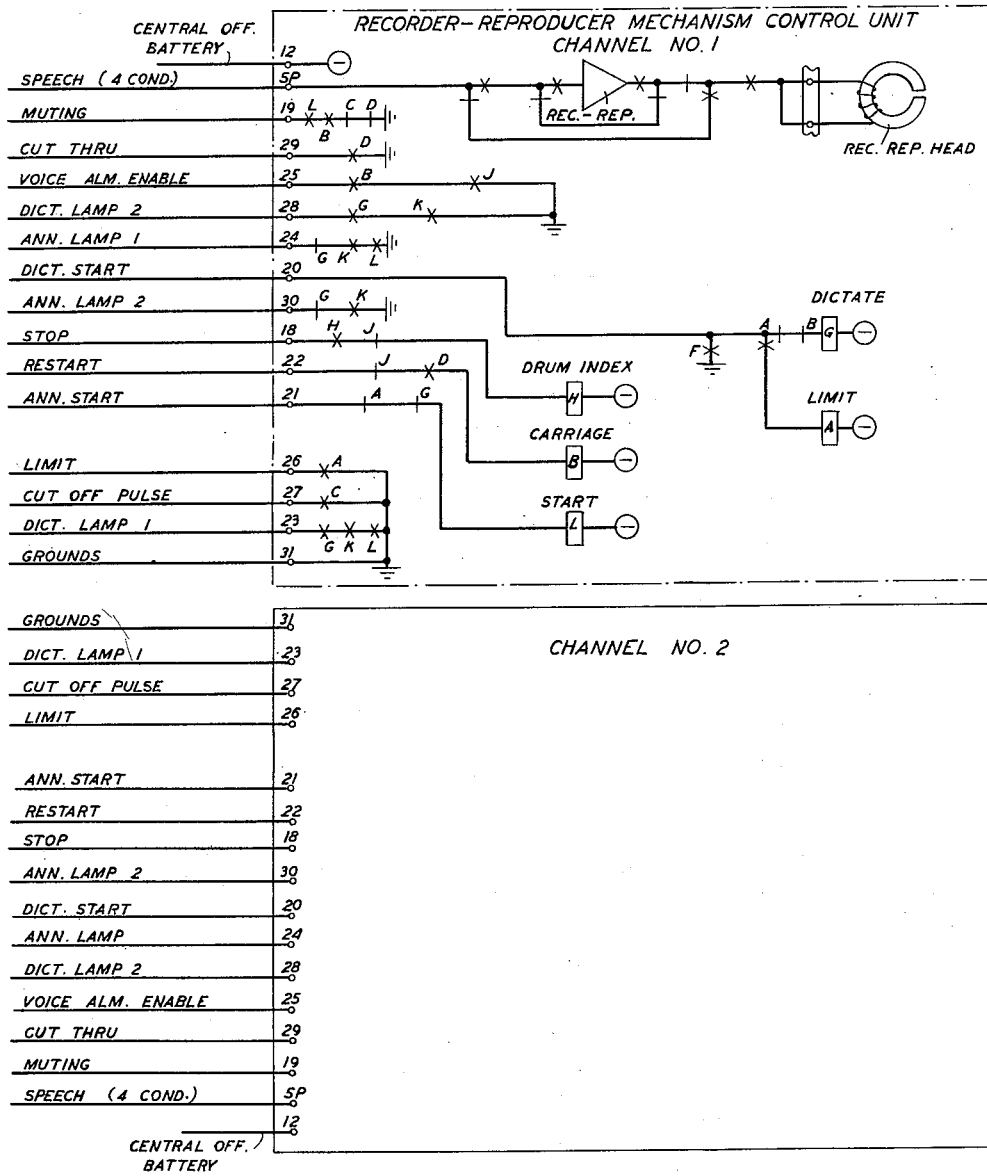
Figure 8:
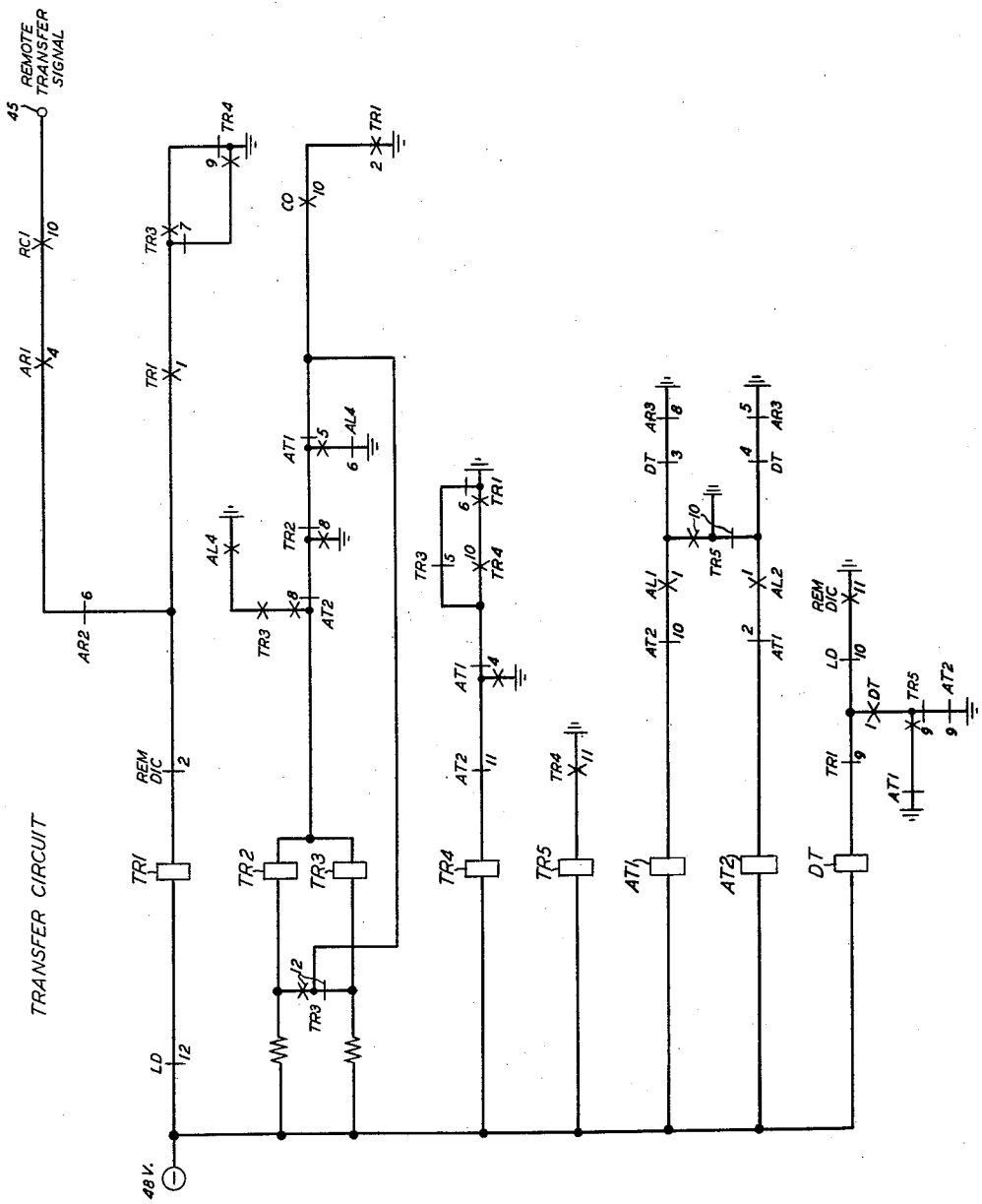
Figure 9:
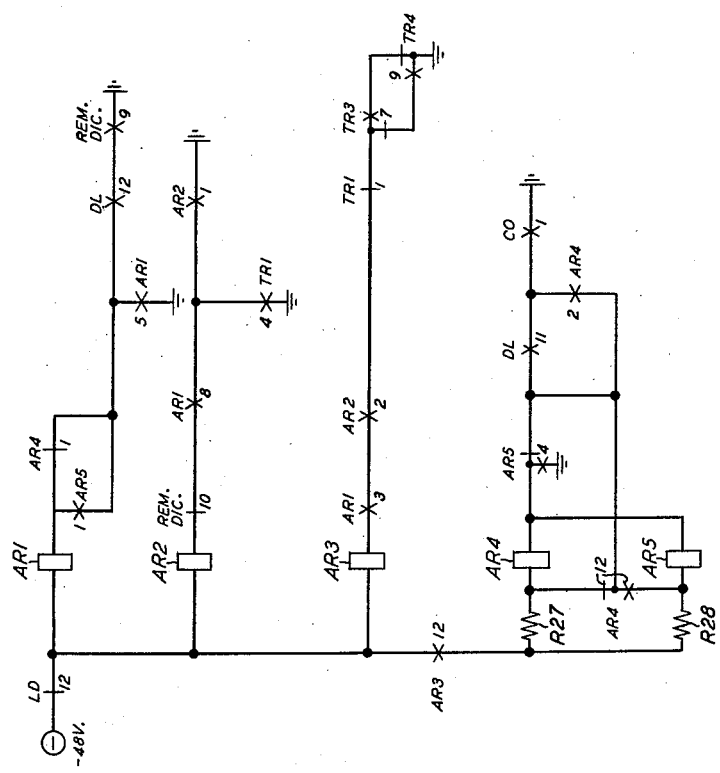
Figure 10:
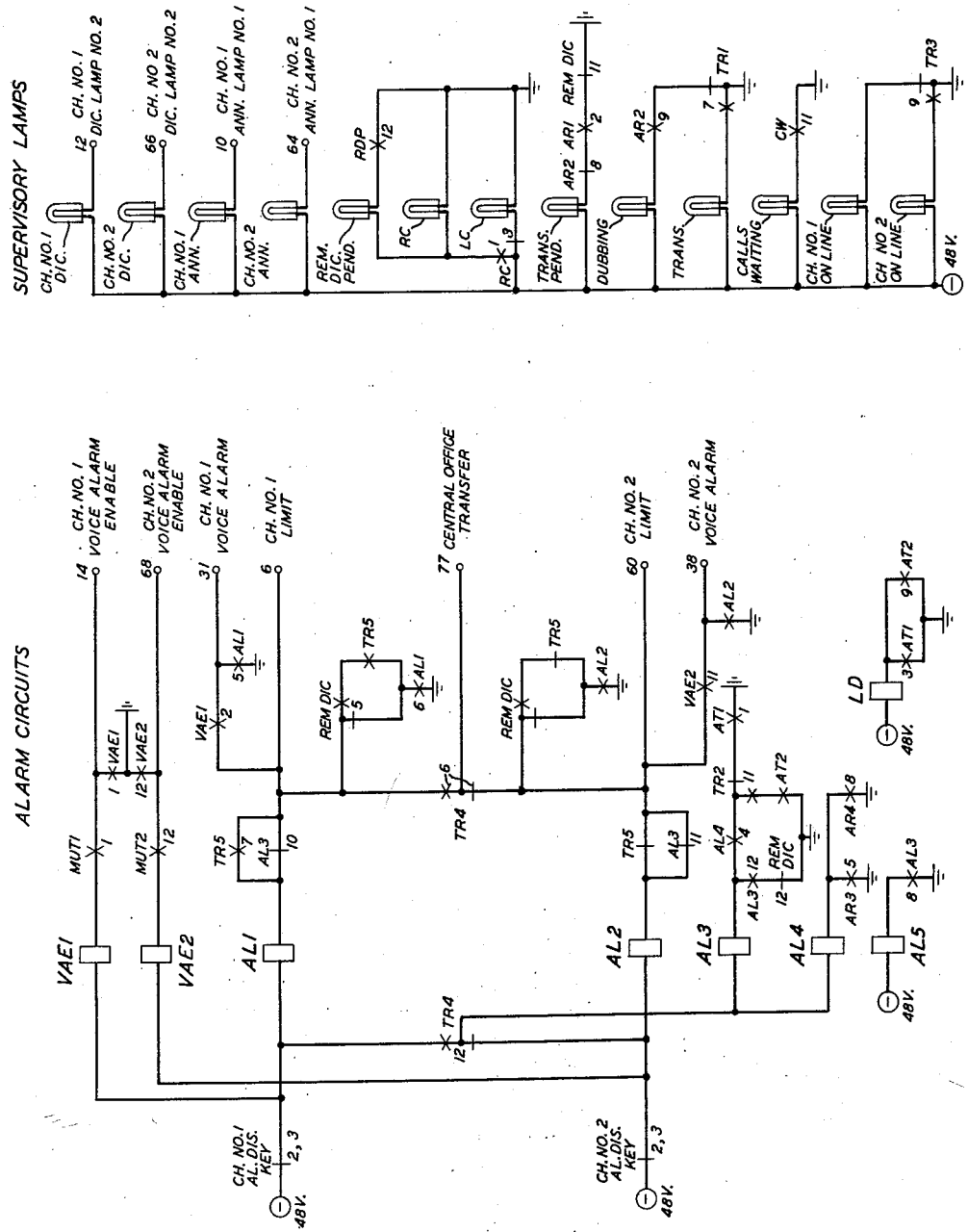
Figure 11:
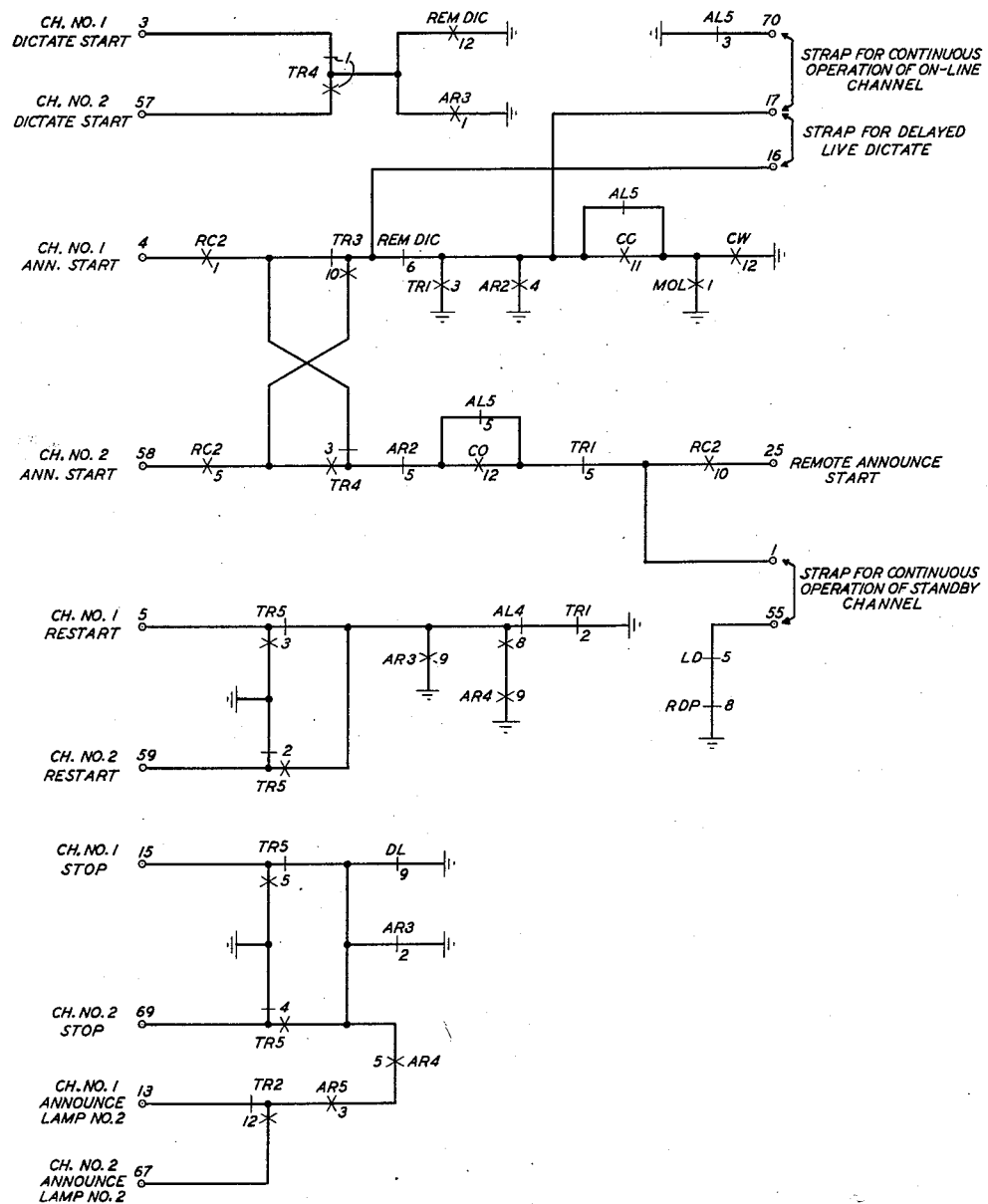
Figure 12:
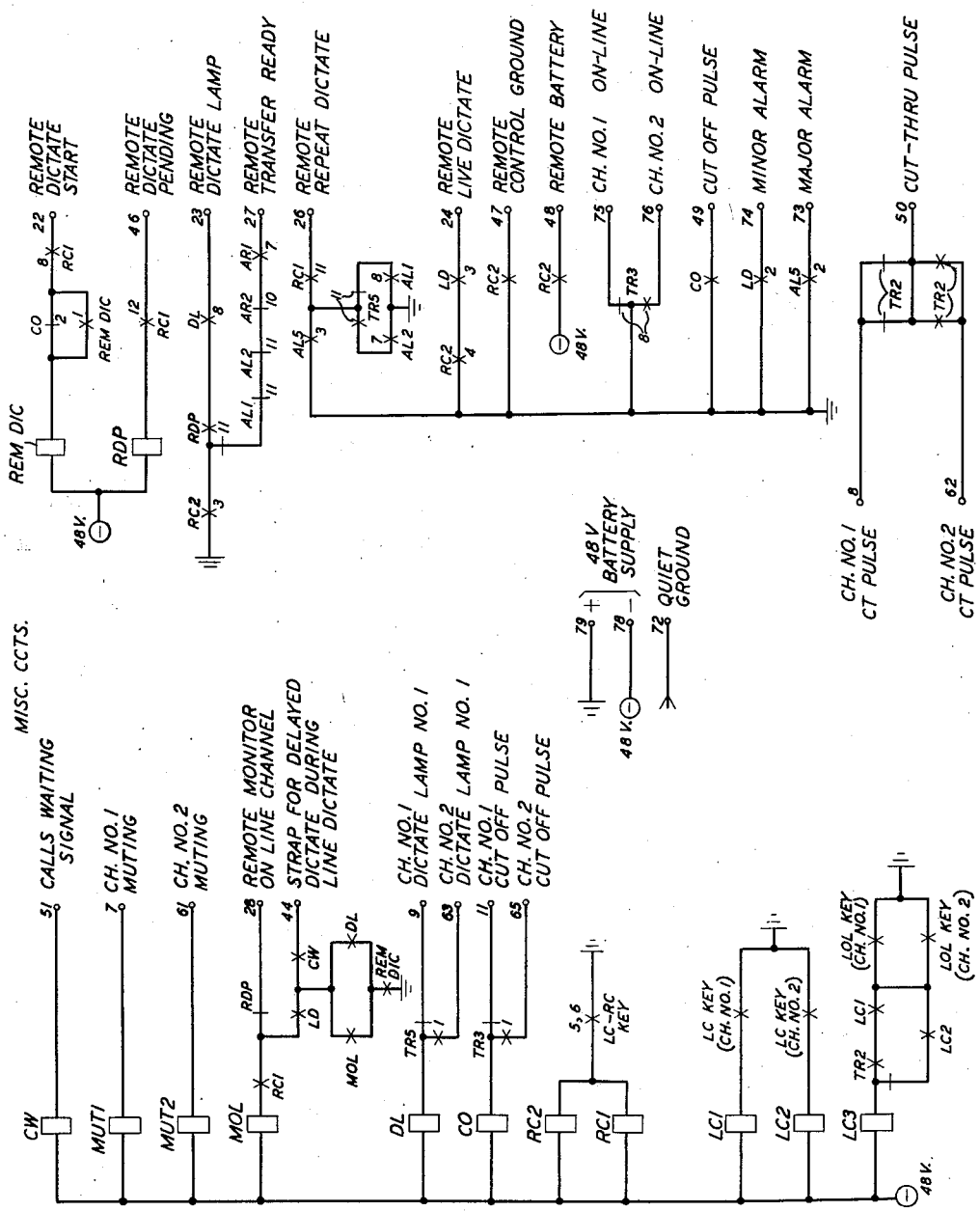

The nature of the invention and its distinguishing features and advantages will be more clearly understood from the following detailed description and the accompanying drawings in which:

FIG. 1 is a block diagram of the announcing system;
FIG. 2 is a simplified functional representation of the control equipment at the customer's premises;
FIG. 3 is a simplified functional representation of the coupling unit at the central office;
FIG. 4 is a simplified functional representation of the components controlled through the recorder-reproducer machine and control unit at the central office;
FIG. 5 shows the arrangement of FIGS. 2, 3 and 4 to provide a functional schematic of the announcing system;
FIG. 6 is a schematic of the recorder-reproducer machine and control unit;
FIG. 7 is a schematic of the coupling unit speech circuit;
FIG. 8 is a schematic of the coupling unit channel transfer circuits;
FIG. 9 is a schematic of the coupling unit automatic dubbing circuits;
FIG. 10 is a schematic of the coupling unit lamp and alarm circuits;
FIG. 11 is a schematic of the coupling unit control signal circuits; and
FIG. 12 is a schematic of the coupling unit miscellaneous circuits.

The recorder-reproducer comprises a magnetic recording and reproducing machine and an integral relay control panel (FIG. 5). The coupling unit (FIG. 2) contains the necessary keys, indicators and relays for controlling both channels independently and collectively. The actual length of a given announcement cycle is variable, being set automatically during the recording process to correspond to the length of the new recording within the limit of a preset maximum. The announcement equipment at the central office originates the proper signals to enable the customer's or operator's control equipment to display the status or condition indications for dictate, repeat dictate, live dictate, and transfer ready. The operator's remote control equipment (FIG. 1) comprises a function switch, a dictate key, a monitor key and a transfer switch. When the function switch is in the check position, an announce start signal is transmitted continuously to the standby channel, and the transfer switch is enabled. The remote dictate pending signal is transmitted to the announcement equipment as long as the function switch is in the dictate position. When the dictate key is operated with the function switch in the dictate position, the dictate start signal is transmitted to the available channel of the announcement equipment. This key must be held down during the dictating period and released immediately upon its completion. Release of the dictate key terminates the record function and automatically adjusts the length of the subsequent announcement cycle to coincide with the length of the completed recording. Momentary operation of the transfer switch presets the transfer function. Actual transfer of the standby channel to the line takes place under the control of the on-line channel. The standby channel is transferred to the line during a cut-off pulse provided at the end of the announcement by the recording-reproducing mechanism of the on-line channel. After transfer is completed, recording or dubbing of the newly recorded announcement on the new standby channel takes place automatically.

If the on-line channel fails during the dictating period, the standby channel is automatically transferred to the line and the dictation is completed live. The live dictate condition will prevail until the defective channel is returned to service.

If the standby channel fails during the dictating period or subsequent check period, a "repeat dictate" condition is established automatically. Transfer of the standby channel to the line is disabled but the operator is permitted to repeat dictating in an effort to retire the standby channel alarm.

If the operator cannot clear the standby channel alarm by re-dictating, access to the on-line channel is achieved by operating the transfer switch. This establishes the live dictate condition. The on-line announcement can then be changed on a live dictate basis following normal dictating procedure.

If the on-line channel fails during the repeat dictate condition, a major alarm results. The operator is allowed to dictate on the standby channel, on a live dictate basis, in an attempt to retire the major alarm and restore single-channel service.

The operator is permitted to cancel transfer and dubbing, and re-dictate the announcement at will.

The recorder-reproducer employs a magnetic-recording drum comprising a magnetic rubber medium molded in the form of a band and stretched over the drum. The record-reproduce head carriage is attached to a half-nut assembly which drives the head laterally across and in contact with the surface of the magnetic recording medium. Erasure of the medium is accomplished by an erase coil mounted in close proximity to the surface of the drum. The head carriage or head-traversing mechanism in association with a limit switch provides a variable cycle feature which automatically presets, at the end of each recording, the length of subsequent reproduce cycles so that they correspond to the length of the individual recording times. The recorder-reproducer also comprises a fixed limit switch by means of which the maximum length of recording time may be preset, and another switch actuated by the head-traversing mechanism to cause the flashing of the dictate lamp of the remote control equipment, during recording, as an end-of-recording-time warning. Two other cam-operated switches included in the recorder-reproducer provide the controls for drum indexing, the generation of the cut-off and cut-through pulses, and the timing of the erase cycle and erase coil current decay. The cams are mounted axially on the lead-screw shaft which drives the half-nut and the head-traversing mechanism.

Control From Remote Location

While there are many features in the system which may be controlled locally at the central office, the invention relates primarily to the control of dictation, transfer, and dubbing from a remote location. The detailed description presented hereinafter will therefore be confined to these features of the system which are shown in the accompanying drawings.

Before attempting to dictate a new announcement, the operator ascertains the status of the system. He (or she) turns the function switch from off to check and then monitors both channels by operating the monitor key to the on-line and standby positions. Presence of speech on both channels indicates that the system is in condition for remote control. Absence of speech on both channels indicates that the remote control facilities are disabled. If monitoring is normal on both channels the operator turns the function switch to the dictate position and depresses the dictate key. As soon as the dictate lamp lights he starts dictating the announcement.

If the operator makes a verbal error, he corrects it by releasing the dictate key, reoperating it immediately and dictating again as soon as the dictate lamp lights. If the recording is satisfactory the operator turns the function switch to the check position thereby enabling the transfer switch. If on checking, the announcement is found to be satisfactory, the operator actuates the transfer switch. Transfer of the standby channel to the line is on a delayed basis, and will take place at the end of the current announcement on the on-line channel.

When the on-line announcement is completed the standby channel is transferred to the line. As transfer of the standby channel to the line is completed the dubbing lamp, on the coupling unit, lights and the dubbing cycle is initiated. The channel transferred from the line now becomes the standby channel. It receives a dictate start signal as the newly recorded channel starts its on-line announce cycle. The standby channel mechanism goes through the recording drum erase procedure and, upon its completion, rotation of the recording drum stops. The on-line channel, in the meantime, continues the announce cycle. When the newly recorded on-line announcement ends, the on-line channel mechanism generates a cut-off pulse, recycles and starts a new announce cycle. The dubbing relays in the coupling unit respond and set up the dubbing process. As the on-line channel announce lamp signal is received by the coupling unit, the standby channel receives a mechanism start command and the recording drum resumes rotation. The on-line announcement is recorded or dubbed on the standby channel as both channel mechanisms run in unison. At the end of the announcement the dubbing lamp on the coupling unit extinguishes and the standby channel recycles to its start position where it remains idle until it receives either a remote announce start or a dictate start signal. The on-line channel also recycles and remains idle until it receives either a call waiting (CW) or a remote monitor-on-line channel signal.

Remote Dictate on Standby Channel

In order to enable dictating from the remote location, the RC key of the Coupling Unit (not shown) is operated to the Remote Control position.

Relays RC1 and RC2 (FIG. 12) operate through contacts 5, 6 of the RC key; the RC lamp (FIG. 10) is lighted through contact 1 of the RC key. In this description channel No. 2 is the on-line channel and channel No. 1 is the standby channel. With channel No. 2 on-line, relays TR2 and TR3 (FIG. 8) are both operated.

The Remote Dictate Pending signal (appearing at terminal 46 of the Coupling Unit, FIG. 12) is established as the remote operator turns the Function switch to the Dictate position; the RDP relay operates through contact 12M of RC1 (FIG. 9) to the ground closure at terminal 46; the RDP lamp lights through contact 1 of the RC key and 12M of the RDP (FIG. 10); the local dictate function is disabled.

Depressing the Dictate key at the remote location initiates the Remote Dictate Start signal (appearing at terminal 22 of the Coupling Unit), operating the REM DIC relay (FIG. 12) through contacts 8M of RC1, 2B of CO. The REM DIC relay is held up through contact 1M of REM DIC. The Channel No. 1 Dictate Start signal (FIG. 11) is initiated through contacts 1B of TR4 and 12M of REM DIC. The channel No. 1 Dictate Start signal (appearing at terminal 3 of the Coupling Unit) places ground on terminal 20 of the mechanism control unit (FIG. 6) to operate dictate relay G in the Channel No. 1 recorder-reproducer, which starts the dictate function. The Remote Record Speech circuit is connected to the record (input) terminals of the channel No. 1 record-reproduce amplifier through contacts 3M and 4M of REM DIC, 3B and 4B of AR3, and 4B and 5B of TR4 (FIG. 7).

The DT relay (FIG. 8) operates through contacts 11M of REM DIC, 10B of LD, and 9B of TR1, and is held up through contacts 9B of TR1, 1M of DT, 9B of AT2, and 9B of TR5. After about 8 seconds have elapsed for drum erasure, the channel No. 1 mechanism initiates (1) the Channel No. 1 Dictate Lamp No. 1 signal (which appears at terminal 9 of the Coupling Unit and operates the DL relay through contact 1B of TR5, FIG. 12), (2) the Channel No. 1 Dictate Lamp No. 2 signal (which appears at terminal 12 of the Coupling Unit and lights the channel No. 1 Dictate lamp, FIG. 10), and (3) the Channel No. 1 Muting signal (which appears at terminal 7 of the Coupling Unit and operates relay MUT1, FIG. 12). At this time recording of an announcement may begin; the remote operator is informed of this fact by initiation of the Remote Dictate Lamp signal, appearing at terminal 23 through contacts 8M of DL, 11M of RDP, and 3M of RC2 (FIG. 12).

Relay AR1 (FIG. 9) operates through contacts 12B of LD, 1B of AR4, 12M of DL, and 9M of REM DIC and holds operated through contacts 12B of LD, 1B of AR4 and 5M of AR1. After about 6 seconds of recording time (1 drum revolution) has elapsed, the channel No. 1 mechanism produces the Channel No. 1 Voice Alarm Enable pulse (which appears at terminal 14 of the Coupling Unit) and operates relay VAE1 (FIG. 10) through contacts 2, 3 of the channel No. 1 AL DIS key and 1M of MUT1. Relay VAE1 holds operated through contacts 2, 3 of the channel No. 1 AL DIS key, 1M of MUT1 and 1M of VAE1.

The voice alarm circuit is thereby enabled. During start-stop operation of the channels, the voice alarm circuit in the Coupling Unit is alternately enabled and disabled at appropriate times. When a channel is idle, the voice alarm circuit is disabled. In the dictate function, the voice alarm circuit is disabled during recycling, erasing, and for the first drum revolution of dictating.

If the recording is long enough to approach the end of the available recording time, the Dictate lamp will start to flash.

The adjustable flash-enabling switch and the cam-operated flashing switch in the record-reproduce mechanism (FIG. 6) pulse the Channel No. 1 Dictate Lamp No. 1 signal (which appears at terminal 9 of the Coupling Unit and pulses the DL relay); the Remote Dictate Lamp signal is pulsed through contacts 8M of DL, 11M of RDP, and 3M of RC2 (FIG. 12).

The dictate process ends as the Dictate key is released and the Remote Dictate Start signal ends.

The transfer pending condition is established as soon as the remote operator releases the Dictate key, if the standby channel is not in an alarm condition. The transfer Pending lamp on the Coupling Unit remains lighted until the remote operator initiates remote transfer.

When the Channel No. 1 Dictate Start signal is terminated (the REM DIC relay releases), ground closure to terminal 3 is terminated by opening the path through contacts 12M of REM DIC (FIG. 11) which then releases dictate relay G in the channel No. 1 recorder-reproducer. The Transfer Pending lamp lights through contact 8B of AR2, 2M of AR1, and 11B of REM DIC (FIG. 10). The Remote Record Speech circuit is disconnected through contacts 3M and 4M of REM DIC, 3B and 4B of AR3, 4B and 5B of TR4, via terminals 29 and 30, from the record (input) terminals of the channel No. 1 record-reproduce amplifier. The channel No. 1 mechanism terminates (1) the Channel No. 1 Dictate Lamp No. 1 signal (which appears at terminal 9 of the Coupling Unit, and releases the DL relay through contact 1B of TR5), (2) the Channel No. 1 Dictate Lamp No. 2 signal (which appears at terminal 12 of the Coupling Unit, and extinguishes the channel No. 1 Dictate lamp), and (3) the Channel No. 1 Muting signal, which appears at terminal 7 of the Coupling Unit and releases relay MUT1, causing release of relay VAE1 through contacts 2, 3 of the channel No. 1 AL DIS key, 1M of MUT1, and 1M of VAE1.

The recording drum of the channel No. 1 mechanism is allowed to index upon removal of the Dictate Start signal. The indexing interval may be as long as 6 seconds (one drum revolution), depending upon the orientation of the drum at the instant the Dictate Start signal is removed. This completes the recording cycle.

The head-carriage (head traversing) mechanism, in association with the fly-back limit switch (of the record-reproduce mechanism), provides the variable-cycle feature which automatically presets, at the end of each recording, the length of subsequent reproduce cycles, so that they correspond to the length of the individual recording times. This arrangement is similar to the one disclosed in Patent 2,866,852 granted to R. A. Miller et al. on December 30, 1958.

If the operator makes a verbal error during dictating, she can erase and record the announcement anew simply by releasing the Dictate key and reoperating it immediately. Operation of the Dictate key also cancels transfer and dubbing presets, and cancels the dubbing cycle (if it is in progress). A channel alarm (if it exists) is also retired.

If the Dictate key is held operated long enough during recording, to allow the mechanism fixed limit switch (which presets the maximum announcement cycle length for a particular installation) to operate, it will be necessary for the operator to release and operate the Dictate key before the dictate function is enabled once again.

The Remote Dictate Pending condition is cancelled as the remote operator turns the Function switch to the Check position. The transfer ready condition is established after the Dictate key has been operated, an announcement recorded, and the Dictate key released, if the recorded announcement is technically acceptable (the standby channel is not in an alarm condition, Repeat Dictate lamp is not on). The Transfer Ready lamp, at the remote location, lights when the function switch is turned to Check. Unless the Transfer Ready lamp is on, transfer of the standby channel to the line from the remote location is not permitted.

*Remote Check on Standby Channel*

The control circuitry has been arranged so that the remote operator can monitor the standby or on-line channel at will by operating the Monitor key to the Monitor Standby or Monitor On Line positions. For normal dual-channel operation, the Monitor key is enabled only for the Check position of the Function switch. If a Calls Waiting signal is present at the Coupling Unit, on-line channel monitoring will be barge-in. In the absence of a CW signal, on-line channel monitoring will start with the beginning of the announcement, unless the on-line mechanism is operating on a continuous basis. In the latter case, the monitoring will be barge-in also.

In this description channel No. 1 is the standby channel and channel No. 2 is the on-line channel. A recording has been made on channel No. 1 in accordance with the description outlined above; the transfer ready condition is established. Relays TR2 and TR3 are operated. By placing the Function switch in the Check position, the remote operator initiates the Remote Announce Start signal (which appears at terminal 25 of the Coupling Unit) and initiates the Channel No. 1 Announce Start signal (on terminal 4 of the Coupling Unit) through contacts 10M of RC2, 5B of TR1, 5B of AL5, 5B of AR2, 3B or TR4 and 1M of RC2 (FIG. 11) which then places ground on terminal 21 of the machine control unit (FIG. 6) to operate the start relay of the channel No. 1 recorder-reproducer. The Remote Transfer Ready signal is given at terminal 27 of the Coupling Unit through contacts 7M of AR1, 10B of AR2, 11B of AL2, 11B of AL1, 11B of RDP and 3M of RC2 (FIG. 12). About 2 seconds elapse before the record-reproduce machine initiates (1) the Channel No. 1 Announce Lamp No. 1 signal (which appears at terminal 10 of the Coupling Unit and lights the channel No. 1 Announce lamp) and (2) the Channel No. 1 Muting signal (which appears at terminal 7 of the Coupling Unit and operates relay MUT1). Reproduced speech appears at this time on terminals 20 and 21 through contacts 2M and 3M of MOL and 3B, 4B of TR2 and 2M, 3 3M of MUT1, via terminals 32 and 33, from the reproduce (output) terminals of the channel No. 1 record-reproduce amplifier. After about 6 seconds the channel No. 1 mechanism produces the Voice Alarm Enable pulse (which appears at terminal 14 of the Coupling Unit, FIG. 10), operating relay VAE1 through contacts 2, 3 of the channel No. 1 of A1 DIS key and 1M of MUT1.

The voice alarm circuit is thereby enabled. During start-stop operation of the channels the voice alarm circuit in the Coupling Unit is alternately enabled and disabled at appropriate times. When a channel is idle, the voice alarm circuit is disabled. For the announce function, the voice alarm circuit is enabled about 8 seconds after the Announce Start signal is applied. During both dictate and announce operation, the voice alarm circuit is disabled for the recycle intervals.

At the end of the announcement speech, a maximum of 6 seconds (1 drum revolution) may elapse before the channel No. 1 machine reaches the indexing point. This completes the announce cycle.

At the end of the announcement cycle the Channel No. 1 Announce Lamp No. 1 signal (which appears at terminal 10 of the Coupling Unit) is terminated, allowing the channel No. 1 Announce lamp to extinguish, and the Channel No. 1 Muting signal (which appears at terminal 7 of the Coupling Unit) is terminated, releasing relay MUT1 which then releases relay VAE1 through contact 1M of MUT1. The mechanism cycles in the announce function as long as the function switch is in the check position and the Remote Announce Start signal appears on terminal 25.

*Remote Transfer of the Standby Channel to the Line*

Remote transfer is permitted only if the transfer ready condition exists. The transfer ready condition is indicated by the Transfer Ready lamp on the Operator's Control Unit. It lights in the Check position of the Function switch after the Dictate key has been operated, announcement recorded, and Dictate key released, if the recorded announcement is technically acceptable and the standby channel is not in an alarm condition. The Transfer Ready lamp is displayed until operation of the Transfer switch has conditioned the transfer function. Automatic Transfer (transfer of the standby channel to the line because of an alarm on the on-line channel) is not disabled during illumination of the Transfer Ready lamp. Automatic Transfer extinguishes the Transfer Ready lamp.

Transfer of the standby channel to the line, on command from the remote location, is on a delayed basis. The on-line channel completes the announcement before transfer takes place. Actual transfer occurs during the cutoff pulse on the on-line channel. If the on-line channel is idle (no calls waiting signal, and not strapped for continuous operation), the on-line channel is started and made to run through an announce cycle. Transfer then takes place during the cutoff pulse on the on-line channel.

In this description channel No. 2 is the on-line channel and channel No. 1 is the standby channel. Upon operation of the Transfer switch (of the remote control equipment) the Remote Transfer signal appears on terminal 45 of the Coupling Unit; relay TR1 (FIG. 8) operates through contacts 10M of RC1, 4M of AR1, 6B of AR2, 2B of REM DIC and 12B of LD. Relay DT (FIG. 8) releases via contacts 9B of TR1, 1M of DT, 9B of AT2 and 9B of TR5. The Transfer lamp lights through contact 7M of TR1. The on-line channel starts an announce cycle upon operation of TR1, if the CW or MOL relays are not operated; the Channel No. 2 Announce Start signal (FIG. 11) is initiated through contacts 3M of TR1, 6B of REM DIC, 10M of TR3 and 5M of RC2 causing the start relay of the channel No. 2 mechanism to operate.

The Channel No. 1 Restart signal (which consists of removal of ground to terminal 5) is provided through contacts 2B of TR1, 8B of AL4 and 3B of TR5 (FIG. 11). The Channel No. 1 Announce start signal (appearing at terminal 4 of the Coupling Unit) is removed, by operation of TR1, through contacts 1M of RC2, 3B of TR4, 5B of AR2, 5B of AL5 and 5B of TR1. The channel No. 1 machine then terminates (1) the Channel No. 1 Announce Lamp No. 1 signal (which appears at terminal 10 of the Coupling Unit) extinguishing the channel No. 1 Announce lamp, and (2) terminates the Channel No. 1 Muting signal (which appears at terminal 7 of the Coupling Unit) and releases relay MUT1, causing relay VAE1 to release. Relay AR2 (FIG. 9) operates through contacts 12B of LD, 10B of REM DIC, 8M of AR1 and 4M of TR1 causing the Transfer Pending Lamp (FIG. 10) to extinguish via contacts 8B of AR2, 2M of AR1 and 11B of REM DIC, and terminating the Remote Transfer Ready signal (which appears at terminal 27 of the Coupling Unit) by operation of contact 10B of AR2, through contacts 7M of AR1, 11B of AL2, 11B of AL1, 11B of RDP and 3M of RC2 (FIG. 12).

With the Channel No. 2 Restart signal activated (by operation of TR1), the Channel No. 2 machine recycles and steps to await completion of the on-line announcement.

At the end of the on-line announce cycle, the Channel No. 2 machine produces a cutoff pulse (which appears at terminal 65 of the Coupling Unit) causing the CO relay to operate through contact 1M of TR3 (FIG. 12) and causing a cutoff pulse to appear on terminal 49 of the Coupling Unit (for use by the distributing circuits) through contact 5M of CO. Operation of the CO relay causes release of relay TR2 (FIG. 8), using the shuntdown path through contacts 12M of TR3, 10M of CO and 2M of TR1. At the termination of the cutoff pulse (appearing on terminal 65) the CO relay releases, terminating the cutoff pulse appearance at terminal 49 through contact 5M of CO, and releasing relay TR3 through contacts 8B of AT2, 8B of TR2, 5B of AT1, 10M of CO and 2M of TR1. Release of relay TR3 enables the Channel No. 1 On-Line signal (terminal 75), and terminates the Channel No. 2 On-Line signal (terminal 76) via transfer contact 8 of TR3 (FIG. 12), lights the channel No. 1 On-Line lamp through contact 9B of TR3 and extinguishes the channel No. 2 On-Line lamp through contact 9M of TR3 (FIG. 10).

Relay TR1 is released by release of TR3, which opens the holding path for TR1 through contacts 12B of LD, 2B of REM DIC, 1M of TR1, 7M of TR3 and 9B of TR4. The Transfer lamp extinguishes via contact 7M of TR1, and relay TR4 operates through contacts 6B of TR1, 5B of TR3, 4B of AT1 and 11B of AT2.

Transfer of Channel No. 1 to the line is now completed; Channel No. 2 now becomes the standby channel. Relay AR2 provides the Channel No. 1 Announce Start signal through contacts 1M of RC2, 10B of TR3, 6B of REM DIC and 4M of AR2 (FIG. 11).

Relay AR1 was operated at the start of the remote dictate process through contacts 9M of REM DIC, 12M of DL, 1B of AR4 and 12B of LD, and is held operated through contact 5M of AR1. Operation of AR1 constitutes the transfer pre-set. When TR1 is operated at the start of the transfer cycle, relay AR2 operates through contacts 4M of TR1, 8M of AR1, 10B of REM DIC and 12B of LD; it holds operated through contacts 1M of AR2, 8M of AR1, 10B of REM DIC and 12B of LD.

Operation of AR2 constitutes the automatic dubbing preset.

Depressing the remote Dictate key (with the Function switch in the Dictate position) will cancel the transfer cycle and release the dubbing preset. Depressing the Dictate key initiates the Remote Dictate Start signal appearing at terminal 22 of the coupling unit (FIG. 12), which operates relay REM DIC. This opens contact 2B of REM DIC (FIG. 8) and releases relay TR1, thereby canceling the transfer cycle. It also opens contact 10B of REM DIC (FIG. 9) to release relay AR2, and thereby cancels the dubbing preset or cycle if in progress.

To cancel transfer (or dubbing) and recapture the standby channel, the operator may turn the Function switch to Dictate and depress the Dictate key. As soon as the Dictate lamp lights, he must redictate the announcement. (The Transfer lamp on the Coupling Unit extinguishes as the Dictate key is operated; the standby channel Dictate lamp lights; the Transfer Pending lamp comes on as the Dictate key is released.)

Only one transfer is possible for each remote transfer command, following each recording of a technically acceptable announcement on the standby channel. The dubbing cycle is automatically initiated at the start of the announcement cycle of the on-line channel following transfer.

*Automatic Dubbing of On-Line Announcement on Standby Channel*

The dubbing cycle (announcement on the on-line channel is recorded automatically on the standby channel) is automatically initiated only after remote transfer. The operator may check this by turning the Function switch to the Dictate position—the Dictate lamp will light. It remains on for the duration of the dubbing cycle.

As transfer of the standby channel to the line is completed, on command from the remote operator, the Dubbing lamp lights; the dubbing cycle is initiated.

The channel transferred from the line becomes the standby channel; it receives a Dictate Start signal as the newly recorded channel starts its on-line announce cycle. The standby channel machine goes through the recording drum erase procedure; as its Dictate lamp (on the Coupling Unit) lights, the recording drum stops rotation. The on-line channel, in the meantime, continues the announce cycle.

In this description, channel No. 1 is the on-line channel and channel No. 2 is the standby channel, having just been transferred to this condition by the process described above. Relay AR2 provides the channel No. 1 Announce Start signal (at terminal 4 of the Coupling Unit) through contacts 1M of RC2, 10B, of TR3, 6B of REM DIC and 4M of AR2 (FIG. 11). Relays TR4 and TR5 are operated. The Dubbing lamp lights through contacts 9M of AR2 and 7B of TR1 (FIG. 10). Relay AR3 (FIG. 9) operates through contacts 12B of LD, 3M of AR1, 2M of AR2, 1B of TR1, 7B of TR3 and 9M of TR4. The channel No. 2 Restart signal (which consists of removal of ground to terminal 59 of the Coupling Unit) is terminated through contacts 2M of TR5 and 9M of AR3 (FIG. 11). The channel No. 2 Dictate Start signal (which appears at terminal 57 of the Coupling Unit) is initiated through contacts 1M of TR4 and 1M of AR3 (FIG. 11) and operates the dictate or record relay in the channel No. 2 machine. Relay AL4 (FIG. 10) operates through contacts 2, 3 of the channel No. 1 AL DIS key, 12M of TR4, and 5M of AR3. At this time drum erasure starts and continues for about 8 seconds.

At the end of drum erasure the channel No. 2 machine initiates (1) the channel No 2 Muting signal (which appears at terminal 61 of the Coupling Unit and operates relay MUT2), (2) the channel No 2 Dictate Lamp No. 1 signal (which appears at terminal 63 of the Coupling Unit and operates relay DL through contact 1M of TR5), and (3) the channel No. 2 Dictate Lamp No. 2 signal (which appears at terminal 66 of the Coupling Unit and lights the channel No. 2 Dictate lamp). The Remote Dictate Lamp signal appears at terminal 23 of the Coupling Unit through contacts 3M of RC2, 11M of RDP and 8M of DL. Upon operation of the DL relay, the channel No. 2 Stop signal (which consists of removal of ground to terminal 69 of the Coupling Unit) is initiated through contacts 4M of TR5 and 9B of DL (FIG. 11). The recording drum of the channel No. 2 machine stops and remains stopped until the beginning of the next announce cycle, whereupon the channel No. 2 Stop signal is terminated by the channel No. 1 Announce Lamp No. 2 signal.

When the on-line announcement (newly recorded) ends, the on-line channel machine generates a cutoff pulse, recycles and starts a new announce cycle. The dubbing relays in the Coupling Unit respond and initiate the dubbing process. As the on-line channel Announce Lamp signal is received by the Coupling Unit, the standby channel gets a machine start command; the recording drum resumes rotation; the on-line announcement is recorded (dubbed) on the standby channel as both channels run in unison.

At the end of the announcement, the Dubbing lamp on the Coupling Unit extinguishes and the standby channel recycles to its indexed position, where it remains idle unless a Remote Announce Start signal or strapping for continuous operation is present. The on-line channel also recycles and remains idle unless a Call Waiting signal or strapping for continuous operation is present.

Erasure of the recording drum in the standby channel is completed; the drum is stopped; start of the dubbing process awaits end of the on-line announcement on Channel No. 1.

At the start of the channel No. 1 cutoff pulse (which is produced by the channel No. 1 machine, and appears at terminal 11 of the Coupling Unit) the CO relay operates through contact 1B of TR3, and cutoff pulse appearance (at terminal 49 of the Coupling Unit, for use by the central office circuits) is obtained through contact 5M of CO; relay AR5 (FIG. 9) operates through contacts 12B of LD, 12M of AR3, 300 ohm resistor R28, contacts 4B of AR5, 11M of DL, and 1M of CO, and is held operated through contact 4M of AR5. The termination of the Channel No. 1 cutoff pulse (terminal 11) releases the CO relay and terminates the cutoff pulse appearance (at terminal 49) through contact 5M of CO. Relay AR4 operates (its shuntdown path is opened) through contacts 12B of AR4, 11M of DL, 1M of CO, and 300 ohm resistor R27, and is held operated through contacts 4M of AR5. The channel No. 2 Record Speech terminals (36 and 37) are connected to the Central Office Speech bus through contacts 4M and 5M of TR4, 3M and 4M of AR3, 4M and 7M of AR4, and resistors R10, R11, R12, R13, R14, and R15. After about 2 seconds the channel No. 1 machine initiates the channel No. 1 Announce Lamp No. 2 signal (which appears at terminal 13 of the Coupling Unit), terminating the channel No. 2 Stop signal (at terminal 69 of the Coupling Unit) through contacts 12B of TR2, 3M of AR5, 5M of AR4, and 4M of TR5 (FIG. 10). Termination of channel No. 2 Stop signal consists of grounding terminal 69. The channel No. 2 machine starts, and the on-line channel announcement is now recorded on the standby channel and is also applied to the Central Office Speech bus.

After about 6 seconds of recording time (1 drum revolution) has elapsed, the channel No. 2 mechanism produces the channel No. 2 Voice Alarm Enable pulse (appearing at terminal 68 of the Coupling Unit), operating relay VAE2 through contacts 2, 3 of the channel No. 2 AL DIS key and 12M of MUT2. Relay VAE2 holds operated through contacts 2, 3 of the channel No. 2 AL DIS key, 12M of MUT2, and 12M of VAE2 (FIG. 10).

If the announcement is long enough, the adjustable flash-enabling switch and the cam-operated flashing switch in the record-reproduce mechanism will pulse the Channel No. 2 Dictate Lamp No. 1 signal (which appears at terminal 63 of the Coupling Unit and pulses the DL relay); the Remote Dictate Lamp signal is pulsed through contacts 8M of DL, 11M of RDP and 3M of RC2.

At the end of the on-line channel announcement the channel No. 1 mechanism produces a cutoff pulse (which appears at terminal 11 of the Coupling Unit, operating the CO relay through contact 1B of TR3); relay AR5 is released by the shunt-down path through contacts 12B of LD, 12M of AR3, the 300 ohm resistor R28, contact 12M of AR4, 2M of AR4, and 1M of CO; a cutoff pulse appears at terminal 49 (for use by the central office circuits) through contact 5M of CO; relay AR1 releases through contact 12B of LD, 1M of AR5 and 5M of AR1; relays AR2 and AR3 release through contact 12B of LD, 10B of REM DIC, 8M of AR1 and 1M of AR2 and 3M of AR1 and 2M of AR2. The Dubbing lamp extinguishes (by release of AR2) through contacts 9M of AR2 and 7B of TR1. At the termination of the Channel No. 1 Cutoff pulse (at terminal 11) the CO relay releases through contact 1B of TR3; the cutoff pulse appearing at terminal 49 (for use by the central office circuits) is terminated through contact 5M of CO; relay AR4 is released (its holding path is opened) through contacts 12B of LD, 12M of AR3, 4B of AR5, 2M of AR4, and 1M of CO. The Channel No. 2 Dictate Start Signal (which appears at terminal 57 of the Coupling Unit and holds the record relay of the channel No. 2 mechanism operated) is terminated by opening the ground closure through contacts 1M of TR4 and 1M of AR3. The channel No. 2 machine terminates (1) the channel No. 2 Dictate Lamp No. 1 signal (which appears at terminal 63 of the Coupling Unit and releases the DL relay through contact 1M of TR5), (2) the channel No. 2 Dictate Lamp No. 2 signal (which appears at terminal 66 of the Coupling Unit and extinguishes the channel No. 2 Dictate lamp), and (3) the channel No. 2 Muting signal (which appears at terminal 61 of the Coupling Unit and releases relays MUT2 and VAE2). The remote Dictate Lamp signal (appearing at terminal 23 of the Coupling Unit) is terminated through contacts 3M of RC2, 11M of RDP and 8M of DL. The channel No. 2 record speech terminals (36 and 37) are disconnected from the Central Office Speech bus through contacts 4M and 5M of TR4, 3M and 4M of AR3, 4M and 7M of AR4, and resistors R10, R11, R12, R13, and R14. This completes the dubbing cycle.

If the operator decides, during the dubbing cycle, that he wants to change or redictate the announcement, he can cancel dubbing, at any time, by turning the Function switch to Dictate and depressing the Dictate key. Operation of the remote Dictate key (with the Function switch in the Dictate position) will release the dubbing relays AR2, AR3, AR4 and AR5. He must at this time record the new announcement. After this is completed, he follows the transfer procedure previously outlined in order to get the new announcement on the line.

*Automatic Transfer*

When a channel alarm condition occurs or a transfer command is received from the central office alarm circuit, the affected channel stops. This procedure is necessary to avoid transmitting a technically unacceptable announcement to the line and to avoid the possibility of damage to the mechanism from continuing operation during an alarm condition.

Automatic transfer of the standby channel to the line will take place if a voice or limit alarm on the on-line channel occurs, and upon a transfer command from the central office alarm equipment. Automatic transfer is always barge-in and always automatically creates live dictate and minor alarm conditions. The standby channel is not recycled if it is operating at the time. If the standby channel is in the dictate function at the time of automatic transfer, the dictate cycle is not interrupted, but is completed live; the remote operator gets the live dictate lamp immediately to tell her she will have to complete the dictation in progress "live."

Automatic dubbing does not occur after automatic transfer due to any cause.

The central office transfer pulse (the RT pulse) is treated as an alarm pulse; the central office alarm equipment is implemented to recognize speech or cut-through pulse failure. This transfer pulse is sent to the announcement equipment as failure is detected. It will transfer the standby channel to the line and automatically establish the live dictate condition. Automatic dubbing does not follow, however. The RT pulse is enabled during all operating conditions except live dictate.

In this description channel No. 1 is the on-line channel and channel No. 2 is the standby channel. In normal operation of the dual-channel equipment with channel No. 1 on-line, relays TR4 and TR5 are operated. Operation of automatic transfer does not depend upon the position of the RC key or upon the operated condition of relays REM DIC, TR1 and AR1. After the voice alarm circuit is enabled, i.e., relays MUT1 and VAE1 are operated, (1) appearance of a channel No. 1 voice alarm signal (which appears at terminal 31 of the coupling unit in response to a voice alarm condition as recognized by the channel record-reproduce amplifier) or (2) channel No. 1 limit signal (which appears at terminal 6 of the Coupling Unit in response to operation of the fixed limit switch of the channel mechanism) will operate relay AL1, thus initiating an automatic transfer (FIG. 10). Relay AL1 is operated by a ground closure at terminal 31 (the Channel No. 1 Voice Alarm Signal) through contacts 2, 3 of the channel No. 1 AL DIS key, 7M of TR5 and 2M of VAE1, and is held operated through contacts 2, 3 of the channel No. 1 AL DIS key, 7M of TR5, 2M of VAE1 and 5M of AL1; it may alternately be operated by ground closure at terminal 6 (the channel No. 1 limit signal) through contacts 2, 3 of the channel No. 1 AL DIS key and 10B of AL3 (or 7M of TR5) and held operated by contacts 2, 3 of the channel No. 1 AL DIS key, 10B of AL3 (or 7M of TR5), 2M of VAE1 and 5M of AL1. The central office transfer pulse (appearing at terminal 77 of the coupling unit in response to a voice alarm condition, or the absence of cut-through pulses, as recognized by the central office alarm equipment) operates relay AL1 through contacts 6M of TR4, 10B of AL3 (or 7M of TR5), and 2, 3 of the channel No. 1 AL DIS key. Relay AT1 operates through contacts 10B of AT2, 1M of AL1 and 10M of TR5, which then operates relays TR2 and TR3 through contacts 8B of AT2, 8B of TR2, 5M of AT1 and 6B of AL4, and operates the LD relay (FIG. 10) through contact 3M of AT1. The remote live dictate signal (which appears at terminal 24 of the coupling unit) is established through contacts 2M of RC2 and 3M of LD. A minor alarm signal (appearing at terminal 74 of the coupling unit) is initiated through contact 2M of LD.

Channel No. 2 is now the on-line channel, and it is in the live dictate condition; channel No. 1 is the standby channel. Transfer relays TR2, TR3, TR4 and TR5 are all operated in live dictate operation of the dual-channel mechanism with channel No. 2 on-line. This concludes the automatic transfer cycle.

*Delay Transfer and Repeat Dictate*

In normal dual-channel service, operation of the remote Dictate key (with function switch in dictate position) sets-up the delay-transfer condition. This condition persists until the standby channel is transferred to the line or the on-line channel is made to go into a live-dictate state. During the delay transfer interval a standby channel alarm will not cause the system to go into live dictate, single channel operation automatically, instead, the repeat dictate condition is established.

If the standby channel fails while the operator is dictating an announcement, repeat dictate condition occurs. She is made aware of this by the appearance of the repeat dictate lamp. The alarm lamp on the coupling unit for the standby channel also lights; since the delayed transfer condition is established, the minor alarm lamp does not light. The standby channel alarm may have been caused by the operator (low speech level causing a voice alarm or excessive announcement length causing a mechanism limit switch operation alarm). The operator attempts to correct this fault by releasing and operating the dictate key. As soon as the dictate lamp lights she dictates the announcement. The repeat dictate lamp extinguishes when the dictate key is operated; the repeat dictate circuits are disabled for about the first 6 seconds of the announcement; if the alarm condition still exists or is re-established later in the announcement the repeat dictate lamp will light again.

If the standby channel fails during checking a newly recorded announcement but prior to transferring to the line, the repeat dictate lamp lights. Since the repeat dictate condition could have been caused by the operator's dictating technique, she should dictate again (as described above).

If the repeat dictate condition is established by a failure of the announcement equipment, the operator may capture the on-line channel by causing the system to go into live dictate and then proceed with her dictating on the on-line channel. This procedure is described in the following section entitled "Transfer (Remote) of the On-Line Channel to Live Dictate When Standby Channel is in Repeat Dictate Condition."

The repeat dictate lamp lights if the standby channel fails during the dubbing cycle. The operator may attempt to restore the standby channel to normal operating conditions by dictating the announcement again, or she may allow the dubbing cycle to go to completion, after which the coupling unit automatically establishes the live dictate condition for the on-line channel. If the operator depresses the dictate key, the repeat dictate lamp extinguishes and the alarm condition, which is retired momentarily also, will remain retired if the standby channel alarm condition is corrected by the new recording.

If the on-line channel fails during live dictate operation, the repeat dictate lamp lights. The operator is instructed to turn the function switch to Dictate immediately and operate the dictate key. The major alarm condition is retired as the repeat dictate lamp extinguishes, but will be re-established if the alarm condition on the on-line channel persists or re-occurs during recording of the announcement.

If the on-line channel fails during dubbing, a major alarm and repeat dictate condition are established; dubbing is cancelled, mechanisms of both channels stop, standby channel circuits are transferred to the line. The operator can attempt to restore service by turning the Function switch to Dictate, depressing the dictate key, and dictating the announcement. With operation of the dictate key, live dictate conditions are established, the repeat dictate condition is cancelled, and the major alarm is replaced by a minor alarm.

Automatic transfer of the standby channel to the line is disabled for the repeat dictate interval; an alarmed channel cannot be transferred to the line. During delay transfer, a voice or limit alarm in the standby channel will cause the repeat dictate condition regardless of the function being performed by the remote operator.

If the on-line channel fails during the repeat dictate interval, a major alarm results; the live dictate and repeat dictate lamps light. Under these conditions the operator depresses the dictate key and starts dictating (the same action as described for on-line channel failure during the dubbing cycle now follows). If the repeat dictate condition was caused by a correctable operator fault (low speech level, or excessive announcement length), live dictate operation is established. If the alarm is non-correctable by the operator, the major alarm will return and persist until action is taken by the central office personnel.

In live dictate operation (single-channel operation), the repeat dictate condition is displayed in the same manner as in dual-channel operation, except that the repeat dictate lamp indicates an alarm in the on-line channel, and since it is on simultaneously with the live dictate lamp, indicates a major alarm condition.

As in dual-channel operation, the repeat dictate lamp is retired by the operation of the remote dictate key.

In this description channel No. 1 is the standby channel and channel No. 2 is the on-line channel. Relays TR2 and TR3 are operated. The DT relay is operated (remote dictating is in progress or has occurred) through contacts 11M of REM DIC, 10B of LD and 9B of TR1, as long as no alarm conditions exist. The DT relay is held operated through contacts 9B of TR1, 1M of DT, 9B of TR5 and 9B of AT2. The RC key is in the Remote control position; relays RC1 and RC2 are operated through contacts 5, 6 of the RC key; the RC lamp is lighted through contacts 1, 2 of the RC key.

Relays MUT1 and VAE1 are operated during the first 6 seconds of recording or announcement time. Either (1) the channel No. 1 voice alarm signal (which appears at terminal 31 of the coupling unit) or (2) the channel No. 1 limit signal (which appears at terminal 6 of the coupling unit) may cause operation of relay AL1 through contact 2, 3 of the channel No. 1 AL DIS key, 10B or AL3 (or 7M of TR5), and (for voice alarm operation) 2M of VAE1. Relay AL1 is held operated through contacts 2, 3 of the channel No. 1 AL DIS key, 10B of AL3 (or 7M of TR5), and through either 2M of VAE1 and 5M of AL1 or through 5B of REM DIC and 6M of AL1; the remote repeat dictate signal (which appears at terminal 26 of the coupling unit) is enabled through contacts 11M or RC1, 11B of TR5 and 8M of AL1.

By releasing the dictate key, the remote operator terminates the remote dictate start signal appearing at terminal 22 of the coupling unit. This releases relay REM DIC through contacts 8M of RC1 and 1M of REM DIC, and causes the mechanism to index and stop and release relays MUT1 and VAE1. At this time the only holding path for relay AL1 is through contact 5B of REM DIC. When the remote operator depresses the dictate key, the remote dictate start signal is initiated and operates relay REM DIC through contacts 8M of RC1 and 2B of CO. This opens the holding path for relay AL1 through contact 5B of REM DIC, and relay AL1 releases. The remote repeat dictate signal (appearing at terminal 26 of the coupling unit) is terminated through contacts 11M of RC1, 11B of TR5 and 8M of AL1. About 8 seconds are required at this time for drum erasure.

At the end of drum erasure the channel No. 1 mechanism produces the channel No. 1 muting signal (which appears at terminal 7 of the coupling unit and operates relay MUT1); after about 6 seconds (1 drum revolution) relay VAE1 operates through contacts 2, 3 of the channel No. 1, AL DIS key and 1M of MUT1. The voice alarm circuit is thereby enabled. The repeat dictate condition may now be established if the channel alarm persists or reoccurs. In that event remote transfer of the on-line channel to the live dictate condition (as described hereinafter) should be carried out. If the repeat dictate condition is not reestablished by the standby channel, the dictate cycle may now be completed in the manner previously described for dictate-remote (standby channel).

*Transfer (Remote) of On-Line Channel to Live Dictate When Standby Channel is in Repeat Dictate Condition*

The repeat dictate lamp lights as soon as an alarm occurs, in either the dictate or check positions of the function switch. It is extinguished when the remote operator depresses the dictate key, but it will light again during the dictate cycle (or subsequent check cycle) if the alarm condition persists or is re-established.

The remote operator can gain access to the on-line channel for recording by turning the function switch to the check position and operating the transfer key. This procedure automatically establishes the live dictate condition for the on-line channel; the operator should only follow this procedure if she cannot clear the standby channel alarm by dictating again.

Upon operation of the transfer key, the live dictate lamp lights and the repeat dictate lamp extinguishes. The live dictate lamp (of the on-line channel) on the coupling unit also lights, and a minor alarm sounds, alerting central office personnel.

In this description channel No. 1 is the standby channel and channel No. 2 is the on-line channel. With channel No. 2 on-line and the channel No. 1 alarmed, relays AR1, TR2, TR3, AL1, RC1, RC2 and lamps RC and AL1 are operated; the remote repeat dictate signal (appearing at terminal 26 of the coupling unit) is established. The remote operator initiates the remote transfer signal (appearing at terminal 45 of the coupling unit, FIG. 8) by operating the transfer key at the remote location with the function switch in the check position. Relay TR1 operates on this closure through contacts 10M of RC1, 4M of AR1, 6B of AR2, 2B of REM DIC and 12B of LD and holds operated through contacts 12B of LD, 2B of REM DIC, 1M of TR1, 7M of TR3 and 9B of TR4. The transfer lamp lights through contact 7M of TR1; the DT relay releases through contacts 9B of TR1, 1M of DT, 9B of TR5 and 9B of DT AT2, and relay AR2 operates through contacts 12B of LD, 10B of REM DIC, 8M of AR1 and 4M of TR1. Relay AT1 operates (upon release of relay DT) through contacts 10B of AT2, 1M of AL1, 3B of DT and 8B of AR3; relay LD operates through contacts 3M of AT1; relay TR4 operates through contacts 11B of AT2 and 4M of AT1, and relay TR5 operates through contact 11M of TR4. The remote repeat dictate signal is terminated (upon operation of TR5) through contacts 11M of RC1, 11B of TR5, and 8M of AL1 (the remote repeat dictate signal consists of a closure to ground and appears at terminal 26 of the coupling unit). The remote live dictate signal (appearing at terminal 24 of the coupling unit, FIG. 12) is initiated upon operation of relay LD through contacts 3M of LD and 4M of RC2. The minor alarm signal (appearing at terminal 74 of the coupling unit) is initiated through contact 2M of LD; relay AR2 holds operated through contacts 10B of REM DIC, 8M of AR1 and 1M of AR2. All of the AR relays are released upon operation of relay LD (battery supplies for these relays is removed through contact 12B of LD); relay TR1 releases through contact 12B of LD, and the transfer lamp extinguishes through contact 7M of TR1.

The release of TR1 concludes the remote transfer of the on-line channel to the live dictate condition. Channel No. 1 remains the standby channel and channel No. 2 is in live dictate. The remote live dictate function is described hereinafter.

*Standby Channel Alarm During Dubbing*

If the standby channel fails during the dubbing cycle (the standby channel, just released from on-line service, is being dubbed from the on-line channel which has the newly recorded announcement), the channel alarm lamp will light immediately. The repeat dictate lamp on remote operator's control unit will also light as soon as the alarm occurs.

Automatic transfer to the live dictate condition is withheld until dubbing is completed to allow the remote operator to repeat dictate—the operator can attempt to clear the standby channel alarm by placing the function switch in the dictate position, depressing the dictate key, and dictating the announcement. This action cancels dubbing and may clear the standby channel alarm, thereby avoiding a live dictate condition.

He can also ignore the repeat dictate lamp. If he does so, the on-line channel will automatically go into the live dictate condition as soon as the dubbing process is completed.

In this description channel No. 1 is the on-line channel and channel No. 2 is the standby channel. Channel No. 1 is not, however, in the live dictate condition, therefore transfer relays TR4 and TR5 are operated and TR2 and TR3 are non-operated. With the remote control (RC) key in the remote control position, relays RC1 and RC2 are operated, the dubbing cycle is in progress, and therefore, relays AR1, AR2, AR3, AR4, AR5, AL4, MUT1, VAE1, MUT2, and VAE2 are all operated. Channel No. 2 voice or limit alarm operation causes operation of relay AL2. The channel No. 2 limit alarm signal (which appears at terminal 60 of the coupling unit) operates relay AL2 through contacts 2, 3 of the channel No. 2 AL DIS key and 11B of AL3. The channel No. 2 voice alarm signal (which appears at terminal 38 of the coupling unit) operates relay AL2 through contacts 2, 3 of the channel No. 2 AL DIS key, 11B of AL3 and 11M of VAE2; the remote repeat dictate signal (appearing at terminal 26 of the coupling unit) is enabled, through contacts 7M of AL2, 11M of TR5 and 11M of RC1.

In accordance with the description presented heretofore, at the end of the dubbing cycle relays AR1, AR2, AR3, AR4, AR5, AL4, DL, MUT1 and VAE1 all release, and relay AT2 then operates through contacts 2B of AT1, 1M of AL2, 4B of DT and 5B of AR3. Operation of relay AT2 places channel No. 1 in the live dictate condition, (relay LD is operated) and in live dictate operation of the dual-channel mechanism with channel No. 1 on-line, transfer relays TR2, TR3, TR4, and TR5 are all non-operated. Relay LD is operated through contact 9M of AT2; relay TR4 is released (its holding path is open) through contacts 11B of AT2, 4B of AT1, 10M of TR4 and 6M of TR1, and relay TR5 is released through contact 11M of TR4. The remote repeat dictate signal (which appears at terminal 26 of the coupling unit) is terminated through contacts 7M of AL2, 11M of TR5 and 11M of RC1; the remote live dictate signal (which appears at terminal 24 of the coupling unit) is initiated through contacts 4M of RC2 and 3M of LD; and the minor alarm signal (appearing at terminal 74 of the coupling unit, for use by the central office alarm circuit) is initiated through contact 2M of LD.

This completes the alarm-during-dubbing sequence. Channel No. 2 remains the standby channel, channel No. 1 is on-line and is in the live dictate condition.

When the standby channel alarms during dubbing the repeat dictate lamp lights. The operator may turn the function switch to the dictate position and dictate an announcement in an attempt to restore the standby channel to normal operating conditions or she may do nothing, allowing the dubbing cycle to go to completion (the dictate lamp extinguishes at the end of the dubbing cycle) after which time the coupling unit automatically establishes the live dictate condition.

The first choice of action may be preferred because the operator may be able to restore the standby channel to normal operation and thereby avoid a live dictate condition. It has the disadvantage however, of not alerting the central office personnel to the occurrence of trouble in the dubbing circuits which may not occur again until the next time automatic dubbing is initiated.

On-Line Channel Alarm During Dubbing

Throughout the dubbing cycle automatic transfer of the standby channel to the line in the event of on-line channel failure is not permitted. If the on-line channel fails at this time, both channels are considered to be in an alarm condition. The standby channel, though technically good, has only a partial announcement. The automatic dubbing cycle is cancelled automatically and both mechanisms are stopped. A major alarm is originated by the coupling unit and the live dictate and repeat dictate lamps light at the remote location. The technically good standby channel is preset for on-line service under live dictate conditions.

The control circuit is arranged so that the remote operator can restore service in this case if she operates the function switch to the dictate position, depresses the dictate key and starts dictating the announcement. Upon operation of the dictate key, the repeat dictate lamp is extinguished and the major alarm is cancelled but the minor alarm is maintained.

In this description channel No. 1 is the on-line channel and channel No. 2 is the standby channel. During normal dubbing with channel No. 1 on-line, transfer relays TR4 and TR5 are operated and TR2 and TR3 are non-operated. With the RC key in the remote control position relays RC1 and RC2 are operated. In addition, relays AR1, AR2, AR3, AR4, AR5, AL4, MUT1, MUT2, VAE1 and VAE2 are all operated. Initiation of the channel No. 1 voice or limit alarm signal operates relay AL1; the channel No. 1 limit alarm signal (which appears at terminal 6 of the coupling unit) operates relay AL1 through contacts 2, 3 of the channel No. 1 AL DIS key and 10B of AL3; and the channel No. 1 voice alarm signal (appearing at terminal 31 of the coupling unit) operates relay AL1 through contacts 2, 3 of the channel No. 1 AL DIS key, 10B of AL3 and 2M of VAE1. Relay AL1 holds operated through contacts 2, 3 of the channel No. 1 AL DIS key, 10B of AL3, 2M of VAE1 and 5M of AL1; relay AT1 operates through contacts 10B of AT2, 1M of AL1 and 10M of TR5; relay AL3 operates through contacts 2, 3 of channel No. 1 AL DIS key, 12M of TR4, 4M of AL4, 11B of TR2 and 1M of AT1; relay LD operates through contact 3M of AT1; and relay AL5 operates through contact 8M of AL3.

The major alarm relays are now operated. The channel No. 1 announce start signal (appearing at terminal 4 of the coupling unit) is terminated by opening the ground closure to terminal 4 through contact 10B of TR3, 9B of LD (or 6B of REM DIC), and 4M of AR2; the channel No. 2 announce start signal is terminated by opening contact 5B of AL5. The remote repeat dictate signal (which appears at terminal 26 of the coupling unit) is initiated through contacts 11M of RC1 and 3M of AL5; the major alarm signal (appearing at terminal 73 of the coupling unit for use by the central office alarm circuit) is initiated through contact 2M of AL5.

The standby channel is technically usable, though having only a partial announcement recorded on its drum. The dual-channel control circuit recognizes that live dictate operation could be initiated on this channel by release of the AL3, AL4 and AL5 relays.

The remote live dictate signal (appearing at terminal 24 of the coupling unit) is initiated through contacts 3M of LD and 4M of RC2; the minor alarm signal (appearing at terminal 74 of the coupling unit for use by the central office alarm circuit) is initiated through contact 2M of LD; relays AR1, AR2, AR3, AR4, and AR5 are all released (their mutual battery supply is opened) through contact 12B of LD. The channel No. 2 dictate start signal (which appears at terminal 57 of the coupling unit) is terminated through contacts 1M of TR4 and 1M of AR3; relay AL4 is released upon release of AR3 and AR4 through contacts 2, 3 of the channel No. 1 AL DIS key, 12M of TR4 and 5M of AR3 (or 8M of AR4); relays TR2 and TR3 operate through contacts 8B of AT2, 8B of TR2, 5M of AT1 and 6B of AL4, and are held operated through contacts 8B of AT2 and 8M of TR2. The channel No. 2 on-line signal (for use by the distributing circuits, appearing at terminal 76 of the coupling unit) is initiated through contact 8M of TR3. Both channel mechanisms index and stop. Transfer relays TR2, TR3, TR4 and TR5 are all operated for channel No. 2 on the line and in the live dictate condition. This completes the alarm sequence.

Channel No. 2 is preset for live dictate operation; its speech circuits will be connected to the line as soon as its mechanism is started. It will start only upon initiation of the remote dictate start signal. The sequence in cancelling the on-line channel alarm during dubbing is described below.

Cancel On-Line Channel Alarm During Dubbing (Restore Service on Live Dictate Basis)

When an alarm occurs on the on-line channel during dubbing, the standby channel is preset for on-line service, live dictate indications are established, but both mechanisms are stopped. As already noted, the automatic dubbing cycle is cancelled, and a major alarm condition exists. The remote control circuit is arranged so that the remote operator can restore announcement service by operating the function switch to the dictate position, depressing the dictate key, and starting to dictate the announcement. Upon operation of the dictate key, the repeat dictate and major alarm conditions are cancelled but a minor alarm condition persists.

Channel No. 1 is the on-line channel before the alarm condition arises. When the alarm condition occurs, both mechanisms are stopped and channel No. 2 is preset for on-line service in the live dictate condition. This description follows the sequence of actions on channel No. 2 to the point at which the channel No. 2 mechanism is ready to receive the announcement for recording. The remaining actions necessary to conclude remote live dictate are discussed in the following section.

The remote operator is instructed to operate the function switch to the dictate position (thereby initiating the remote dictate pending signal at terminal 46 of the coupling unit), and operate the dictate key (which initiates the remote dictate start signal at terminal 22 of the coupling unit). The RDP relay operates through contact 12M of RC1; the REM DIC relay operates through contacts 8M of RC1 and 2B of CO, and holds operated during the CO pulse through contacts 1M of REM DIC and 8M of RC1; relay AL3 releases through contacts 2, 3 of the channel No. 1 AL DIS key, 12M of TR4, 12M of AL3 and 12B of REM DIC; relay AL5 releases through contact 8M of AL3. The remote repeat dictate signal (which appears at terminal 26 of the coupling unit) is terminated through contacts 11M of RC1 and 3M of AL5; the major alarm signal (appearing at terminal 73 of the coupling unit) is terminated through contacts 2M of AL5.

The channel No. 2 mechanism is now ready to receive speech for recording in the remote live dictate condition. The LD relay is operated and the remote live dictate and minor alarm signals persist. The channel No. 2 live dictate and minor alarm lamps are lighted. Transfer relays TR2, TR3, TR4 and TR5 are operated in accordance with their status for live dictate operation of the dual-channel mechanism with channel No. 2 on-line. The remote dictating occurs on the on-line channel on a live dictate basis.

Live Dictate, Remote

When the live dictate lamp on the remote operator's control unit is on, the operator dictates "live," i.e., his voice goes to the central office announcement bus (and out to the callers) and simultaneously to the magnetic recording drum of the mechanism. Live dictate conditions prevail when only one channel of the dual-channel system is available to the operator. The transfer and dubbing functions are disabled.

The live dictate lamp on the remote operator's control unit will be energized continuously, as normal procedure, for single-channel operation regardless of cause. It will be permitted to light in the dictate and check positions of the function switch as well as during the dictating process.

When the live dictate lamp on the remote operator's control unit is lighted, a minor alarm condition for the announcement equipment is indicated. When both the live dictate and repeat dictate lamps are on, a major alarm exists in the announcement equipment.

Live dictate operation may be established by (1) a voice alarm (indicating that there has been no sustained speech above a predetermined level at the record-reproduce amplifier output terminal for a predetermined length of time after the mechanism has started operating in response to a start signal), in either the on-line or the standby channel, by (2) a limit alarm (indicating that the fixed limit switch of the mechanism has been operated by the mechanism head-carriage in the reproduce function), in either the on-line or standby channel, by (3) an RT (transfer) pulse (which is also treated as an alarm pulse indicating that the central office alarm equipment has recognized speech or cut-thru pulse failure) originating from the central office alarm equipment, or by operation of the transfer switch on the operator's control unit during a repeat dictate condition.

The live dictate lamp on the operator's control unit and on the coupling unit will light as soon as the condition occurs, regardless of the operating function in progress at the time. The live dictate condition will persist until the channel alarm is cleared.

The live dictate condition is always considered a minor alarm condition. During the live dictate condition announcements are always recorded "live" on the on-line channel.

The operator is instructed to dictate the announcement "live" on the on-line channel following previously established procedures. The live dictate condition prevails until dual-channel operation is restored by central office personnel.

In this description channel No. 1 is the standby channel and channel No. 2 is the on-line channel. In the live dictate operation of the dual-channel equipment, with channel No. 2 on-line, relays TR2, TR3, TR4 and TR5 are all operated. The channel No. 2 on-line lamp is lighted through contact 9M of TR3; the channel No. 2 on-line signal (for use by the distributing circuit, appearing at terminal 76 of the coupling unit) is provided through contact 8M of TR3; relays RC1 and RC2 are operated and the RC lamp is lighted. With the LD relay operated, the minor alarm signal (appearing at terminal 74 of the coupling unit) and the remote live dictate signal (appearing at terminal 24 of the coupling unit) are given.

The remote operator initiates the remote dictate pending signal (appearing at terminal 46 of the coupling unit) by operation of the function switch to the dictate position; the RDP relay operates through contact 12M of RC1; the remote dictate pending lamp lights through contacts 1, 2 of the RC key and 12M of RDP.

The remote operator initiates the remote dictate start signal (appearing at terminal 22 of the coupling unit) by depressing the dictate key; the REM DIC relay operates through contacts 2B of CO and 8M of RC1, and holds operated through contacts 1M of REM DIC and 8M of RC1; the channel No. 2 dictate start signal (appearing at terminal 57 of the coupling unit) is initiated through contacts 1M of TR4 and 12M of REM DIC; the remote record speech circuit (appearing at terminals 18 and 19 of the coupling unit) are connected to the record (input) terminals of the channel No. 2 record-reproduce amplifier, via the channel No. 2 record speech terminals (terminals 36 and 37 of the coupling unit), through contacts 4M and 5M of TR4, 3B and 4B of AR3, 3M and 4M of REM DIC.

Two live dictate options are provided; delayed and barge-in dictate. If the delayed dictate option is used (terminals 16 and 17 of the coupling unit are strapped), and if a CW signal (at terminal 51 of the coupling unit) is present, or if the on-line channel is strapped for continuous running, the start of the dictate cycle is delayed until the announce cycle (if one is in progress) ends. At the end of the announce cycle the channel No. 2 mechanism produces the channel No. 2 cutoff pulse (which appears at terminal 65 of the coupling unit), the CO relay pulses; a cutoff pulse (for use by the distributing circuit, appearing at terminal 49 of the coupling unit) is produced through contact 5M of CO; the channel No. 2 announce lamp is extinguished upon termination of the channel No. 2 announce lamp No. 1 signal. If the barge-in dictate option is used, operation of the REM DIC relay terminates the channel No. 2 announce start signal (which consists of a closure to ground at terminal 58 of the coupling unit), immediately, through contacts 5M of RC2, 10M of TR3 and 6B of REM DIC; the channel No. 2 mechanism terminates the channel No. 2 announce lamp No. 1 signal (terminal 64 of the coupling unit) and the channel No. 2 announce lamp extinguishes. If a CW signal (terminal 51 of the coupling unit) is not present, the mechanism is stopped, and about 2 seconds may elapse; the maximum indexing interval of about 6 seconds (1 drum revolution) may elapse if a CW signal is present and the mechanism is running; at this time drum erasure occurs.

After about 8 seconds have elapsed for drum erasure, the channel No. 2 mechanism produces the cut-through pulse (which is transmitted to the distributing circuit and appears at terminal 50 of the coupling unit) through contacts 1M and 2M of TR2; the mechanism simultaneously produces (1) the channel No. 2 dictate lamp No. 1 signal (which appears at terminal 63 of the coupling unit and operates relay DL through contact 1M of TR5) which initiates the remote dictate lamp signal through contact 8M of DL, 11M of RDP and 3M of RC2, (2) the channel No. 2 dictate lamp No. 2 signal (which appears at terminal 66 of the coupling unit and lights the channel No. 2 dictate lamp) and (3) the channel No. 2 muting signal (which appears at terminal 61 of the coupling unit and operates relay MUT2). At this time recording of an announcement may begin.

After about 6 seconds of recording time (1 drum revolution) has elapsed, the channel No. 2 mechanism produces the channel No. 2 voice alarm enable pulse (which appears at terminal 68 of the coupling unit), operating relay VAE2 through contacts 12M of MUT2 and 2, 3 of the channel No. 2 AL DIS key. Relay VAE2 is held operated through contacts 2, 3 of the channel No. 2 AL DIS key, 12M of MUT2 and 12M of VAE2.

The voice alarm circuit is thereby enabled. During start-stop operation of the channels, the voice alarm circuit in the coupling unit is alternately enabled and disabled at appropriate times. When a channel is idle, the voice alarm circuit is disabled. (The voice alarm relay in the channel record-reproduce amplifier is enabled at all times, but its states are recognized by the coupling unit only at specific times.) In the dictate function, the voice alarm circuit is disabled during recycling, erasing, and for the first drum revolution of dictating.

If the recording is long enough to approach the end of the available recording time, the dictate lamp will start to flash.

The adjustable flash-enabling switch and cam-operated flashing switch in the record-reproduce mechanism pulses (1) the channel No. 2 dictate lamp No. 1 signal (which appears at terminal 63 of the coupling unit and pulses the DL relay through contact 1M of TR5) and (2) the channel No. 2 dictate lamp No. 2 signal (which appears at terminal 66 of the coupling unit and flashes the channel No. 2 dictate lamp). The channel No. 2 dictate lamp flashes on and off and the remote dictate lamp signal (appearing at terminal 23 of the coupling unit) is interrupted at the dictate lamp flashing rate.

The dictate process ends as the dictate key is released. The REM DIC relay releases upon termination of the remote dictate start signal (at terminal 22 of the coupling unit); the channel No. 2 dictate start signal (at terminal 57 of the coupling unit) is terminated through contacts 1M of TR4 and 12M of REM DIC; the channel No. 2 mechanism terminates (1) the channel No. 2 dictate lamp No. 1 signal (which appears at terminal 63 of the coupling unit and releases the DL relay through contact 1M of TR5 and terminates the remote dictate lamp signal, at terminal 23, through contacts 8M of DL, 11M of RDP and 3M of RC2), (2) the channel No. 2 dictate lamp No. 2 signal (which appears at terminal 66 of the coupling unit and extinguishes the channel No. 2 dictate lamp) and (3) the channel No. 2 muting signal (which appears at terminal 61 of the coupling unit and releases relay MUT2 and relay VAE2 through contacts 2, 3 of the channel No. 2 AL DIS key, 12M of MUT2 and 12M of VAE2).

The recording drum of the channel No. 2 mechanism is allowed to "index" upon removal of the remote dictate start signal. The indexing interval may be as long as 6 seconds (one drum revolution), depending upon the orientation of the drum at the instant the dictate start signal is removed.

The head-carriage (head-traversing) mechanism, in association with the flying-back limit switch (of the record-reproduce mechanism) provides the variable-cycle feature which automatically presets, at the end of each recording, the length of subsequent reproduce cycles so that they correspond to the length of the individual recording times.

Upon indexing, the channel No. 2 mechanism produces the channel No. 2 cutoff pulse (appearing at terminal 65 of the coupling unit) which operates and then releases the CO relay through contact 1M of TR3, and delivers a cutoff pulse (for use by the distributing circuit, appearing at terminal 49 of the coupling unit) through contact 5M of CO. This is the end of the dictating process.

If the operator makes a verbal error during dictating, he can erase and record the announcement anew simply by releasing the dictate key and reoperating it immediately.

If the dictate key is held operated long enough, during recording, to allow the mechanism fixed limit switch (which presets the maximum announcement cycle length for a particular installation) to operate, it will be necessary for the operator to release and operate the dictate key before the dictate function is enabled once again. Operation of the fixed limit switch during recording causes a repeat dictate condition which indicates that the recording is technically unacceptable, and must be repeated.

The cutoff and cut-thru pulses of the on-line channel are made available for use by the distributing circuits; these pulses, when generated by the standby channel, are inhibited in the coupling unit.

The remote operator terminates the remote dictate pending signal (at terminal 46) by operating the function switch from the dictate position; the RDP relay releases through contact 12M or RC1; the remote dictate pending lamp extinguishes through contact 1, 2 of the RC key and 12M of RDP.

In order to return the equipment to dual channel operation, the alarm disable (AL DIS) key of the alarmed channel must be operated momentarily to the alarm disable position to release the alarm and live dictate relays. When this occurs the proper operating condition for transfer relays TR2, TR3, TR4 and TR5 will be established.

*Cancel Transfer and Dubbing*

The remote operator may cancel the transfer cycle and recapture the standby channel by operating the function switch to the dictate position and depressing the dictate key. As soon as the dictate lamp lights, he redictates the announcement. The transfer lamp on the coupling unit extinguishes as the dictate key is operated, the dictate lamp lights when the mechanism is ready to accept an announcement for recording, and the transfer pending lamp lights as soon as the dictate key is released.

The remote operator may also cancel the dubbing preset or dubbing cycle at any time by depressing the dictate key with the function switch in the dictate position. He must at this time record a new announcement. After this is completed, the transfer procedure is followed to get the new announcement on the line. The dubbing lamp on the coupling unit extinguishes as the dictate key is depressed, and the remote dictate pending, standby channel dictate and transfer pending lamps are lighted.

With the RC key of the coupling unit operated to the remote control position and with the function switch in the dictate position, relays RC1, RC2 and RDP are operated. Transfer is pre-set by operation of AR1 which operates when the dictate key is depressed. The transfer cycle and dubbing pre-set are established by operation of TR1 and AR2 (respectively) which operate when the remote transfer key is operated. After transfer the dubbing cycle starts with operation of AR3. During the actual dubbing process (during which the on-line announcement is being recorded on the standby channel) relays AR4 and AR5 are also in the operated condition.

By depressing the dictate key, the remote operator initiates the remote dictate start signal (at terminal 22 of the coupling unit) which operates the REM DIC relay through contacts 8M of RC1 and 2B of CO, and holds REM DIC operated for the duration of the CO pulse through contacts 1M of REM DIC and 8M of RC1. Relay TR1 is released (its holding path is opened) through contacts 12B of LD, 2B of REM DIC, 1M of TR1 and (7M of TR3 and 9B of TR4) or (7B of TR3 and 9M of TR4); and relay AR2 releases (its holding path is opened) through contacts 12B of LD, 10B of REM DIC, 8M of AR1 and 1M of AR2. Release of AR2 releases AR3 by opening its holding path which includes contact 2M of AR2. Release of AR3 releases AR4 and AR5 by opening the battery supply to these relays through contact 12M of AR3.

This completes cancellation of the transfer cycle and dubbing preset or dubbing in progress. Control of the standby channel is restored to the remote operator. He then dictates, checks, and transfers as described heretofore.

It is to be understood that the above-described arrangements are illustrative of the application of the principles of the invention. Other arrangements may be devised by those skilled in the art without departing from the spirit and scope of the invention.

What is claimed is:

1. An announcing system comprising a transmission line, two announcing machines, each of said machines including input and output means, electrical circuits for impressing an announcement recorded on said machines upon said transmission line, said circuits being connected to one of said machines, means for recording an announcement on said other machine, means for conditioning the system for transfer of said electrical circuits to said other machine, means responsive to the actuation of said transfer conditioning means for starting the operation of said one machine to reproduce the announcement recorded thereon, means in said one machine for generating a signal after reproduction of the announcement recorded thereon has been completed, means responsive to said signal and the actuation of said transfer conditioning means for transferring said electrical circuits to said other machine, means controlled by said announcement recording means, said transfer conditioning means and said signal responsive means for starting the operation of said other machine and erasing the announcement recorded on said one machine, means in said other machine for generating a signal after reproduction of the announcement recorded thereon has been completed, means responsive to said signal for recycling said other machine, simultaneously starting the operation of said one machine and connecting the output of said other machine to the input of said one machine to record on said one machine the announcement reproduced from said other machine.

2. An announcing system in accordance with claim 1 including means responsive to the signal generated by said other machine after the announcement recorded thereon has been reproduced and recorded on said one machine for stopping the operation of both machines.

3. An announcing system comprising a transmission line, two announcing machines, electrical circuits for impressing an announcement recorded on said machines upon said transmission line, said circuits being connected to one of said machines, means for recording an announcement on said other machine, first switch means actuated by said announcement recording means, means for conditioning the system for transfer of said electrical circuits to said other machine, second switch means actuated in response to the actuation of said transfer conditioning means for starting the operation of said one machine to reproduce the announcement recorded thereon, third switch means actuated in response to the actuation of said first and second switch means, means in said one machine for generating a signal after reproduction of the announcement recorded thereon has been completed, means responsive to said signal for actuating a fourth switch means, means responsive to the actuation of said fourth switch means for transferring said electrical circuits to said other machine, means responsive to the actuation of said third and fourth switch means for starting the operation of said other machine to reproduce the announcement recorded thereon.

4. An announcing system comprising a transmission line, two announcing mechanisms, electrical circuits for impressing an announcement recorded on said machines upon said transmission line, said circuits being connected to one of said machines, means for recording an announcement on said other machine, first switch means actuated by said announcement recording means, means for conditioning the system for transfer of said electrical circuits to said other machine, second switch means actuated from its normal position in response to the actuation of said transfer conditioning means for starting the operation of said one machine to reproduce the announcement recorded thereon, third switch means actuated in response to said actuated first switch means and said second switch means in its off-normal position, means in said one machine for generating a signal after reproduction of the announcement recorded thereon has been completed, means responsive to said signal for actuating a fourth switch means, means responsive to the actuation of said fourth switch means for transferring said electrical circuits to said other machine and for actuating said second switch means to its normal position, fifth switch means actuated in response to the actuation of said second switch means to its normal position and to said actuated third and fourth switch means, means responsive to the actuation of said fifth switch means for erasing the announcement recorded on said one machine.

5. An announcing system comprising a transmission line, two announcing machines, each of said machines including input and output means, electrical circuits for impressing an announcement recorded on said machines upon said transmission line, said circuits being connected to one of said machines, means for recording an announcement on said other machine, first switch means actuated by said announcement recording means, means for conditioning the system for transfer of said electrical circuits to said other machine, second switch means actuated from its normal position in response to the actuation of said transfer conditioning means for starting the operation of said one machine to reproduce the announcement recorded thereon, third switch means actuated in response to the actuation of said first and second switch means, means in said one machine for generating a signal after reproduction of the announcement recorded thereon has been completed, means responsive to said signal for actuating a fourth switch means, means responsive to the actuation of said fourth switch means for transferring said electrical circuits to said other machine and for actuating said second switch means to its normal position, fifth switch means actuated in response to the actuation of said second switch means to its normal position and to said actuated third and fourth switch means, means responsive to the actuation of said fifth switch means for erasing the announcement recorded on said one machine, means responsive to the actuation of said third and fourth switch means for starting the operation of said other machine to reproduce the announcement recorded thereon, means in said other machine for generating a signal after reproduction of the announcement recorded thereon has been completed, means responsive to said signal for recycling said other machine, simultaneously starting the operation of said one machine and connecting the output means of said other machine to the input means of said one machine to record on said one machine the announcement reproduced from said other machine.

6. An announcing system in accordance with claim 5 including means responsive to the signal generated by said other machine after the announcement recorded thereon has been reproduced and recorded on said one machine for stopping the operation of both machines.

7. An announcing system comprising a transmission line, two announcing machines, each of said machines including input and output means, electrical circuits for impressing an announcement recorded on said machines upon said transmission line, said circuits being connected to one of said machines, means for recording an announcement on said other machine, first switch means actuated by said announcement recording means, means for conditioning the system for transfer of said electrical circuits to said other machine, second switch means actuated from its normal position in response to the actuation of said transfer conditioning means, means responsive to the actuation of said second switch means for starting the operation of said one machine to reproduce the announcement recorded thereon, third switch means actuated in response to said second switch means in its off-normal position and to said actuated first switch means, means in said one machine for generating a signal after reproduction of the announcement recorded thereon has been completed, means responsive to said signal for actuating a fourth switch means, means responsive to the actuation of said fourth switch means for transferring said electrical circuits to said other machine and for actuating said second switch means to its normal position, fifth switch means actuated in response to said second switch means in its normal position and to said actuated third and fourth switch means, means responsive to said actuated fifth switch means for erasing the announcement recorded on said one machine, means responsive to said actuated third and fourth switch means for starting the operation of said other machine to reproduce the announcement recorded thereon, means in said other machine for generating a signal after reproduction of the announcement recorded thereon has been completed, means responsive to said signal for operating both of said machines in unison and for connecting the output means of said other machine to the input means of said one machine to record on said one machine the announcement reproduced from said other machine, means responsive to the signal generated by said other machine after the announcement recorded thereon has been reproduced and recorded on said one machine for stopping the operation of both machines.

8. An announcing system comprising a transmission line, two announcing machines, electrical circuits for impressing an announcement recorded on said machines upon said transmission line, said circuits being connected to one of said machines, means for conditioning the system for transfer of said electrical circuits to said other machine, switch means operable to a first position for recording an announcement on said other machine and to a second position after said announcement has been recorded and prior to conditioning said system for transfer of said electrical circuits to said other machine, means responsive to the actuation of said transfer conditioning means for starting the operation of said one machine to reproduce the announcement recorded thereon, means in said one machine for generating a signal after reproduction of the announcement recorded thereon has been completed, means responsive to said signal and the actuation of said transfer conditioning means for transferring said electrical circuits to said other machine, means responsive to the actuation of said switch means to said first position prior to the generation of said signal for canceling the transfer of said electrical circuits.

9. An announcing system comprising a transmission line, two announcing machines, each of said machines including input and output means, electrical circuits for impressing an announcement recorded on said machines upon said transmission line, said circuits being connected to one of said machines, means for conditioning the system for transfer of said electrical circuits to said other machine, first switch means operable to a first position for recording an announcement on said other machine and to a second position after said announcement has been recorded and prior to conditioning said system for transfer of said electrical circuits to said other machine, second switch means actuated when said first switch means is operated to said first position, third switch means actuated in response to the actuation of said transfer conditioning means for starting the operation of said one machine to reproduce the announcement recorded thereon, fourth switch means actuated in response to said actuated second and third switch means, means in said one machine for generating a signal after reproduction of the announcement recorded thereon has been completed, means responsive to said signal for actuating a fifth switch means, means responsive to the actuation of said fifth switch means for transferring said electrical circuits to said other machine, means responsive to said actuated fourth and fifth switch means for starting the operation of said other machine to reproduce the announcement recorded thereon, means in said other machine for generating a signal after reproduction of the announcement recorded thereon has been completed, means responsive to said signal for recycling said other machine, simultaneously starting the operation of said one machine and connecting the output means of said other machine to the input means of said one machine to record on said one machine the announcement reproduced from said other machine.

10. An announcing system in accordance with claim 9 comprising means responsive to the actuation of said first switch means to said first position prior to the generation of said signal by said one machine for releasing said third switch means, thereby canceling the transfer of said electrical circuits.

11. An announcing system in accordance with claim 9 comprising means responsive to the actuation of said first switch means to said first position prior to the generation of said signal by said one machine for releasing said third and fourth switch means, thereby canceling the transfer of said electrical circuits and canceling the conditioning means for recording on said one machine the announcement reproduced from said other machine.

12. An announcing system in accordance with claim 9 comprising means responsive to the actuation of said first switch means to said first position after the generation of said signal by said one machine for releasing said fourth switch means, thereby canceling the recording on said one machine of the announcement reproduced from said other machine.

References Cited in the file of this patent
UNITED STATES PATENTS

| 1,841,197 | Massoneau | Jan. 12, 1932 |
| 2,213,511 | Bennett | Sept. 3, 1940 |